United States Patent
Sengupta et al.

(10) Patent No.: US 12,010,705 B2
(45) Date of Patent: *Jun. 11, 2024

(54) COMMUNICATING REPETITIONS OF MULTIPLE TRANSPORT BLOCKS SCHEDULED BY SINGLE DOWNLINK CONTROL INFORMATION

(71) Applicant: QUALCOMM Incorporated, San Diego, CA (US)

(72) Inventors: Ayan Sengupta, San Diego, CA (US); Alberto Rico Alvarino, San Diego, CA (US); Le Liu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,618

(22) Filed: Dec. 12, 2022

(65) Prior Publication Data

US 2023/0156727 A1   May 18, 2023

Related U.S. Application Data

(63) Continuation of application No. 16/992,952, filed on Aug. 13, 2020, now Pat. No. 11,553,474.

(Continued)

(51) Int. Cl.
*H04W 72/23* (2023.01)
*H04B 1/713* (2011.01)
(Continued)

(52) U.S. Cl.
CPC ............ *H04W 72/23* (2023.01); *H04B 1/713* (2013.01); *H04W 72/0446* (2013.01); *H04L 1/0071* (2013.01); *H04L 1/1893* (2013.01)

(58) Field of Classification Search
CPC ..... H04B 1/713; H04L 1/0071; H04L 1/1893; H04W 72/0446; H04W 72/23
See application file for complete search history.

(56) References Cited

U.S. PATENT DOCUMENTS

| 8,891,462 B2 | 11/2014 | Luo et al. |
| 2016/0143011 A1 | 5/2016 | Xia et al. |

(Continued)

FOREIGN PATENT DOCUMENTS

| WO | WO2017084903 A1 | 5/2017 |
| WO | WO2018063845 A1 | 4/2018 |

(Continued)

OTHER PUBLICATIONS

Huawei., et al., "Scheduling of Multiple Transport Blocks ," 3GPP Draft, 3GPP TSG RAN WG1 Meeting #97, R1-1905979, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051727436, 9 pages, Sections 2 and 3.

(Continued)

*Primary Examiner* — Shah M Rahman
(74) *Attorney, Agent, or Firm* — Holland & Hart LLP

(57) ABSTRACT

Methods, systems, and devices for wireless communications are described. Transport blocks may be scheduled using a single downlink control information (DCI) message. A wireless device may identify mapping pattern for mapping the transport blocks and repetitions of the transport blocks to communication resources. Mapping the transport blocks, or determining a mapping of the transport blocks, to communication resources may include partitioning the communication resources into subunits, where each subunit includes resources spread across each subband of a frequency hop- (Continued)

ping pattern and at least one instance of each of the scheduled transport blocks.

30 Claims, 19 Drawing Sheets

Related U.S. Application Data

(60) Provisional application No. 62/888,412, filed on Aug. 16, 2019.

(51) Int. Cl.
*H04W 72/0446* (2023.01)
*H04L 1/00* (2006.01)
*H04L 1/1867* (2023.01)

(56) References Cited

U.S. PATENT DOCUMENTS

| | | |
|---|---|---|
| 2016/0269939 A1 | 9/2016 | Papasakellariou |
| 2017/0373715 A1* | 12/2017 | Moroga ............... H04W 72/12 |
| 2018/0109286 A1* | 4/2018 | Yao ...................... H04W 4/70 |
| 2018/0115344 A1* | 4/2018 | Xue .................... H04L 5/0012 |
| 2018/0183491 A1 | 6/2018 | Takeda et al. |
| 2018/0375616 A1 | 12/2018 | Beale et al. |
| 2019/0028143 A1* | 1/2019 | Zhang ................. H04L 5/0044 |
| 2019/0165831 A1* | 5/2019 | Zhou .................... H04L 1/0023 |
| 2019/0306861 A1 | 10/2019 | Li et al. |
| 2020/0037186 A1 | 1/2020 | Thangarasa et al. |
| 2020/0120702 A1 | 4/2020 | Dinan |
| 2020/0314886 A1 | 10/2020 | Cohen et al. |
| 2021/0051636 A1 | 2/2021 | Sengupta et al. |
| 2021/0105783 A1 | 4/2021 | Wang et al. |
| 2021/0219329 A1 | 7/2021 | Zhou et al. |
| 2021/0243731 A1 | 8/2021 | Shin et al. |
| 2021/0282137 A1 | 9/2021 | Wang et al. |
| 2021/0314084 A1 | 10/2021 | Hwang et al. |
| 2021/0329634 A1* | 10/2021 | Kim ..................... H04L 27/26 |
| 2021/0385801 A1 | 12/2021 | Shreevastav et al. |
| 2021/0385848 A1 | 12/2021 | Hwang et al. |
| 2022/0052797 A1 | 2/2022 | Yu et al. |
| 2022/0086870 A1* | 3/2022 | Hu ....................... H04L 1/0041 |
| 2022/0210802 A1* | 6/2022 | Hwang ................ H04L 1/1614 |
| 2022/0271880 A1* | 8/2022 | Choi ..................... H04L 1/0009 |

FOREIGN PATENT DOCUMENTS

| | | | |
|---|---|---|---|
| WO | WO2019158484 A1 | 8/2019 | |
| WO | WO-2020032695 A1 * | 2/2020 | ............... H04L 1/08 |
| WO | WO2020220266 A1 | 11/2022 | |

OTHER PUBLICATIONS

International Preliminary Report on Patentability—PCT/US2020/046472, The International Bureau of WIPO—Geneva, Switzerland, dated Mar. 3, 2022.

International Search Report and Written Opinion—PCT/US2020/046472—ISA/EPO—dated Nov. 20, 2020.

3GPP TS 36.213: "3rd Generation Partnership Project, Technical Specification Group Radio Access Network, Evolved Universal Terrestrial Radio Access (E-UTRA), Physical Layer Procedures (Release 16)", 3GPP Standard, Technical Specification, 3rd Generation Partnership Project (3GPP), Mobile Competence Centre, 650, Route Des Lucioles, F-06921 Sophia-Antipolis Cedex, France, vol. RAN WG1, No. V16.1.0, Apr. 3, 2020 (Apr. 3, 2020), pp. 60-284, XP051893810, section 7.1.6.1, section 7.1.6.3.

* cited by examiner

COMMUNICATING REPETITIONS OF MULTIPLE TRANSPORT BLOCKS SCHEDULED BY SINGLE DOWNLINK CONTROL INFORMATION

CROSS REFERENCE

The present Application for patent is a Continuation of U.S. patent application Ser. No. 16/992,952 by SENGUPTA et al., entitled "COMMUNICATING REPETITIONS OF MULTIPLE TRANSPORT BLOCKS SCHEDULED BY SINGLE DOWNLINK CONTROL INFORMATION" filed Aug. 13, 2020, which claims the benefit of U.S. Provisional Patent Application No. 62/888,412 by SENGUPTA et al., entitled "COMMUNICATING REPETITIONS OF MULTIPLE TRANSPORT BLOCKS SCHEDULED BY SINGLE DOWNLINK CONTROL INFORMATION," filed Aug. 16, 2019, each of which are assigned to the assignee hereof, and each of which are expressly incorporated by reference in its entirety herein.

TECHNICAL FIELD

The following relates generally to wireless communications, and more specifically to communicating repetitions of multiple transport blocks scheduled by a single downlink control information (DCI) message.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless communications system may schedule multiple transport blocks with a single downlink control information (DCI) message. The multiple transport blocks may be transmitted by a base station to a UE. Prior to transmission, the multiple transport blocks may be mapped to available resources, where both the base station and the UE may be aware of the mapping if the UE is to properly receive the transport blocks. Appropriate transport block mapping patterns are desired in order to provide time and frequency diversity in the transmissions.

SUMMARY

The described techniques relate to improved methods, systems, devices, and apparatuses that support communicating repetitions of multiple transport blocks scheduled by single downlink control information (DCI).

A method for wireless communication at a user equipment (UE) is described. The method may include receiving a single DCI message scheduling the UE to receive a set of transport blocks, identifying that the set of transport blocks and repetitions of the set of transport blocks are scheduled to be interleaved and to be received over a set of resources in accordance with a frequency hopping pattern that includes a set of subbands and spans a first periodic interval, identifying a mapping pattern for receipt of the set of transport blocks and the repetitions based on the set of resources being partitioned into one or more subunits based on the first periodic interval and a number of the set of transport blocks, where each of the one or more subunits includes resources spread over each subband of the frequency hopping pattern and at least one instance of each of the set of transport blocks, and receiving the set of transport blocks and the repetitions over the set of resources based on the mapping pattern.

An apparatus for wireless communication at a UE is described. The apparatus may include a processor, memory coupled (e.g., operatively, communicatively, functionally, electronically, electrically, etc.) to the processor, and instructions stored in the memory. The instructions may be executable by the processor to cause the apparatus to receive a single DCI message scheduling the UE to receive a set of transport blocks, identify that the set of transport blocks and repetitions of the set of transport blocks are scheduled to be interleaved and to be received over a set of resources in accordance with a frequency hopping pattern that includes a set of subbands and spans a first periodic interval, identify a mapping pattern for receipt of the set of transport blocks and the repetitions based on the set of resources being partitioned into one or more subunits based on the first periodic interval and a number of the set of transport blocks, where each of the one or more subunits includes resources spread over each subband of the frequency hopping pattern and at least one instance of each of the set of transport blocks, and receive the set of transport blocks and the repetitions over the set of resources based on the mapping pattern.

Another apparatus for wireless communication at a UE is described. The apparatus may include means for receiving a single DCI message scheduling the UE to receive a set of transport blocks, means for identifying that the set of transport blocks and repetitions of the set of transport blocks are scheduled to be interleaved and to be received over a set of resources in accordance with a frequency hopping pattern that includes a set of subbands and spans a first periodic interval, means for identifying a mapping pattern for receipt of the set of transport blocks and the repetitions based on the set of resources being partitioned into one or more subunits based on the first periodic interval and a number of the set of transport blocks, where each of the one or more subunits includes resources spread over each subband of the frequency hopping pattern and at least one instance of each of the set of transport blocks, and means for receiving the set of transport blocks and the repetitions over the set of resources based on the mapping pattern.

A non-transitory computer-readable medium storing code for wireless communication at a UE is described. The code may include instructions executable by a processor to receive a single DCI message scheduling the UE to receive a set of transport blocks, identify that the set of transport blocks and repetitions of the set of transport blocks are scheduled to be interleaved and to be received over a set of resources in accordance with a frequency hopping pattern that includes a set of subbands and spans a first periodic interval, identify a mapping pattern for receipt of the set of transport blocks and the repetitions based on the set of resources being partitioned into one or more subunits based on the first periodic interval and a number of the set of transport blocks, where each of the one or more subunits includes resources spread over each subband of the frequency hopping pattern and at least one instance of each of the set of transport blocks, and receive the set of transport blocks and the repetitions over the set of resources based on the mapping pattern.

Some examples of the method, apparatuses, and non-transitory computer-readable medium described herein may further include operations, features, means, or instructions for determining that a cyclic shift was applied to a subunit of the one or more subunits based on determining that a frequency diversity associated with a transmission of a transport block of the set of transport blocks without the application of the cyclic shift may be below a threshold, and determining, for a resource of the set of resources that occurs within the subunit of the one or more subunits, an index associated with the set of transport blocks based on determining that the cyclic shift was applied to the subunit.

Some examples of the method, apparatuses, and non-transitory computer-readable medium described herein may further include operations, features, means, or instructions for determining a second interval that may be at least as long as the first periodic interval based on the interleaving granularity, the number of the set of transport blocks, and a length of the first periodic interval, where the one or more subunits span the second interval.

In some examples of the method, apparatuses, and non-transitory computer-readable medium described herein, determining the length of the second interval may include operations, features, means, or instructions for calculating a least common multiple of a product of multiplying the number of the set of transport blocks by the interleaving granularity and a number of slots included by the first periodic interval.

Some examples of the method, apparatuses, and non-transitory computer-readable medium described herein may further include operations, features, means, or instructions for determining, for a resource of the set of resources, an index associated with the set of transport blocks based on the interleaving granularity, an index of a subunit including the resource, and a value of a cyclic shift applied with the subunit.

Some examples of the method, apparatuses, and non-transitory computer-readable medium described herein may further include operations, features, means, or instructions for determining the index of the subunit includes dividing the index of a slot that includes the resource by a least common multiple of a product of multiplying the number of the set of transport blocks by the interleaving granularity and a number of slots included by the first periodic interval, and rounding a quotient of the division down to a nearest integer.

Some examples of the method, apparatuses, and non-transitory computer-readable medium described herein may further include operations, features, means, or instructions for determining a greatest common factor of the number of the set of transport blocks and a first quotient of dividing a number of slots included by the first periodic interval by the interleaving granularity may be greater than one, where the first quotient may be rounded up to a nearest integer, and determining the value of the cyclic shift applied to the subunit may be equal to a second quotient of dividing a hopping interval by the interleaving granularity, where the second quotient may be rounded up to a nearest integer, based on determining that the greatest common factor may be greater than one.

Some examples of the method, apparatuses, and non-transitory computer-readable medium described herein may further include operations, features, means, or instructions for determining a greatest common factor of the number of the set of transport blocks and a first quotient of dividing a number of slots included by the first periodic interval by the interleaving granularity may be equal to one, where the first quotient may be rounded up to a nearest integer, and determining the value of the cyclic shift applied to the subunit may be equal to zero based on determining that the greatest common factor may be equal to one.

In some examples of the method, apparatuses, and non-transitory computer-readable medium described herein, determining, for the resource of the set of resources, an index associated with the set of transport blocks may include operations, features, means, or instructions for multiplying the index of the subunit by the value of the cyclic shift, adding a product of the multiplying to a quotient of dividing an index of a slot that includes the resource by the interleaving granularity, where the quotient may be rounded down to a nearest integer, and determining a remainder resulting from dividing a sum of the addition by the number of the set of transport blocks.

Some examples of the method, apparatuses, and non-transitory computer-readable medium described herein may further include operations, features, means, or instructions for determining that an initial resource of the set of resources may be aligned with a slot having a starting index of zero.

Some examples of the method, apparatuses, and non-transitory computer-readable medium described herein may further include operations, features, means, or instructions for determining that a set of invalid slots may be interspersed within the set of resources, where the set of invalid slots correspond to a second set of slot indices, identifying a subset of the set of transport blocks and a subset of the repetitions corresponding to respective slot indices of the first set of slot indices that overlap with slot indices of the second set of slot indices, determining that the subset of the set of transport blocks and the subset of the repetitions may be buffered based on the identifying, and receiving the subset of the set of transport blocks and the subset of the repetitions after receiving the remaining interleaved set of transport blocks and repetitions.

In some examples of the method, apparatuses, and non-transitory computer-readable medium described herein, the set of invalid slots includes uplink slots that occur during downlink transmission to the UE, downlink slots that may be occur during uplink transmissions to a base station, blank slots, scheduling slots, broadcast slots, or any combination thereof.

Some examples of the method, apparatuses, and non-transitory computer-readable medium described herein may further include operations, features, means, or instructions for determining that a set of invalid slots may be interspersed within the set of resources, where the set of resources may be associated with valid slots, identifying a consecutive set of slot indices associated with the set of resources, and determining, for the set of resources, an index associated with the set of transport blocks based on the consecutive set of slot indices.

In some examples of the method, apparatuses, and non-transitory computer-readable medium described herein, the identifying includes identifying that the set of transport blocks, repetitions, and one or more blank transport blocks may be interleaved, where each of the one or more subunits includes at least one instance of each of the one or more blank transport blocks.

Some examples of the method, apparatuses, and non-transitory computer-readable medium described herein may further include operations, features, means, or instructions for determining a length of the first periodic interval may be based on multiplying the number of the set of subbands by a number of slots allocated to each of the set of subbands by the frequency hopping pattern.

In some examples of the method, apparatuses, and non-transitory computer-readable medium described herein, the at least one instance of each of the set of transport blocks includes each of the set of transport blocks, a repetition of each of the set of transport blocks, or any combination thereof.

In some examples of the method, apparatuses, and non-transitory computer-readable medium described herein, the repetitions of the set of transport blocks include at least one repetition of each of the set of transport blocks.

In some examples of the method, apparatuses, and non-transitory computer-readable medium described herein, each of the set of transport blocks is scheduled to be received over multiple of the set of resources, and wherein the repetitions of the set of transport blocks comprise a portion of a respective transport block.

A method for wireless communications is described. The method may include transmitting a single DCI message scheduling a UE to receive a set of transport blocks, interleaving the set of transport blocks with repetitions of the set of transport blocks that include at least one repetition of each of the set of transport blocks, where the set of transport blocks and the repetitions are to be transmitted over a set of resources in accordance with a frequency hopping pattern that includes a set of subbands and spans a first periodic interval, partitioning, based on the interleaving and a mapping pattern, the set of transport blocks and the repetitions into one or more subunits based on the first periodic interval and a number of the set of transport blocks, where each of the one or more subunits includes at least one instance of each of the set of transport blocks and spans at least the first periodic interval, mapping the set of transport blocks and the repetitions to the set of resources based on the partitioning, and transmitting the set of transport blocks and the repetitions over the set of resources based on the mapping.

An apparatus for wireless communications is described. The apparatus may include a processor, memory coupled (e.g., operatively, communicatively, functionally, electronically, electrically, etc.) to the processor, and instructions stored in the memory. The instructions may be executable by the processor to cause the apparatus to transmit a single DCI message scheduling a UE to receive a set of transport blocks, interleave the set of transport blocks with repetitions of the set of transport blocks that include at least one repetition of each of the set of transport blocks, where the set of transport blocks and the repetitions are to be transmitted over a set of resources in accordance with a frequency hopping pattern that includes a set of subbands and spans a first periodic interval, partition, based on the interleaving and a mapping pattern, the set of transport blocks and the repetitions into one or more subunits based on the first periodic interval and a number of the set of transport blocks, where each of the one or more subunits includes at least one instance of each of the set of transport blocks and spans at least the first periodic interval, map the set of transport blocks and the repetitions to the set of resources based on the partitioning, and transmit the set of transport blocks and the repetitions over the set of resources based on the mapping.

Another apparatus for wireless communications is described. The apparatus may include means for transmitting a single DCI message scheduling a UE to receive a set of transport blocks, means for interleaving the set of transport blocks with repetitions of the set of transport blocks that include at least one repetition of each of the set of transport blocks, where the set of transport blocks and the repetitions are to be transmitted over a set of resources in accordance with a frequency hopping pattern that includes a set of subbands and spans a first periodic interval, means for partitioning, based on the interleaving and a mapping pattern, the set of transport blocks and the repetitions into one or more subunits based on the first periodic interval and a number of the set of transport blocks, where each of the one or more subunits includes at least one instance of each of the set of transport blocks and spans at least the first periodic interval, means for mapping the set of transport blocks and the repetitions to the set of resources based on the partitioning, and means for transmitting the set of transport blocks and the repetitions over the set of resources based on the mapping.

A non-transitory computer-readable medium storing code for wireless communications is described. The code may include instructions executable by a processor to transmit a single DCI message scheduling a UE to receive a set of transport blocks, interleave the set of transport blocks with repetitions of the set of transport blocks that include at least one repetition of each of the set of transport blocks, where the set of transport blocks and the repetitions are to be transmitted over a set of resources in accordance with a frequency hopping pattern that includes a set of subbands and spans a first periodic interval, partition, based on the interleaving and a mapping pattern, the set of transport blocks and the repetitions into one or more subunits based on the first periodic interval and a number of the set of transport blocks, where each of the one or more subunits includes at least one instance of each of the set of transport blocks and spans at least the first periodic interval, map the set of transport blocks and the repetitions to the set of resources based on the partitioning, and transmit the set of transport blocks and the repetitions over the set of resources based on the mapping.

Some examples of the method, apparatuses, and non-transitory computer-readable medium described herein may further include operations, features, means, or instructions for aligning an initial resource of the set of resources with a slot having a starting index of zero.

Some examples of the method, apparatuses, and non-transitory computer-readable medium described herein may further include operations, features, means, or instructions for determining a second interval that may be at least as long as the first periodic interval based on the interleaving granularity, the number of the set of transport blocks, and a length of the first periodic interval, where the one or more subunits span the second interval.

In some examples of the method, apparatuses, and non-transitory computer-readable medium described herein, determining the length of the second interval may include operations, features, means, or instructions for calculating a least common multiple of a product of multiplying the number of the set of transport blocks by the interleaving granularity and a number of slots included by the first periodic interval.

Some examples of the method, apparatuses, and non-transitory computer-readable medium described herein may further include operations, features, means, or instructions for determining whether to apply, before the mapping, a cyclic shift to a subunit of the one or more subunits based on a frequency diversity associated with each transport block of the set of transport blocks based on the mapping pattern.

Some examples of the method, apparatuses, and non-transitory computer-readable medium described herein may further include operations, features, means, or instructions for applying, before the mapping, the cyclic shift to the subunit based on determining that that the frequency diversity associated with a transmission of a transport block of the set of transport blocks without the application of the cyclic shift may be below a threshold.

Some examples of the method, apparatuses, and non-transitory computer-readable medium described herein may further include operations, features, means, or instructions for refraining from applying the cyclic shift to the subunit based on determining that a greatest common factor of the number of the set of transport blocks and a quotient of dividing a number of slots included by the first periodic interval by the interleaving granularity may be equal to one, where the quotient may be round up to the nearest integer.

Some examples of the method, apparatuses, and non-transitory computer-readable medium described herein may further include operations, features, means, or instructions for applying the cyclic shift to the subunit based on determining that a greatest common factor of the number of the set of transport blocks and a quotient of dividing a number of slots included by the first periodic interval by the interleaving granularity may be greater than one, where the quotient may be round up to the nearest integer.

Some examples of the method, apparatuses, and non-transitory computer-readable medium described herein may further include operations, features, means, or instructions for determining that a set of invalid slots may be interspersed within the set of resources, where the set of invalid slots correspond to a second set of slot indices, and where the set of resources may be associated with valid slots, identifying a subset of the set of transport blocks and a subset of the repetitions corresponding to respective slot indices of the first set of slot indices that overlap with slot indices of the second set of slot indices, buffering the subset of the set of transport blocks and the subset of the repetitions based on the identifying, and transmitting the subset of the set of transport blocks and the subset of the repetitions after transmitting the remaining interleaved set of transport blocks and repetitions.

In some examples of the method, apparatuses, and non-transitory computer-readable medium described herein, the set of invalid slots includes uplink slots that occur during downlink transmission to the UE, downlink slots that may be occur during uplink transmissions to a base station, blank slots, scheduling slots, broadcast slots, or any combination thereof.

Some examples of the method, apparatuses, and non-transitory computer-readable medium described herein may further include operations, features, means, or instructions for determining that a set of invalid slots may be interspersed within the set of resources, where the set of invalid slots correspond to a second set of slot indices, where the set of resources may be associated with valid slots, and where the set of transport blocks and the repetitions may be mapped to the set of resources based on the determining.

In some examples of the method, apparatuses, and non-transitory computer-readable medium described herein, the interleaving includes interleaving the interleaved set of transport blocks and repetitions with one or more blank transport blocks according to the mapping pattern.

Some examples of the method, apparatuses, and non-transitory computer-readable medium described herein may further include operations, features, means, or instructions for allocating the set of resources to the UE, where the set of resources span a second interval that may be longer than the first periodic interval.

DETAILED DESCRIPTION

Figure 1:
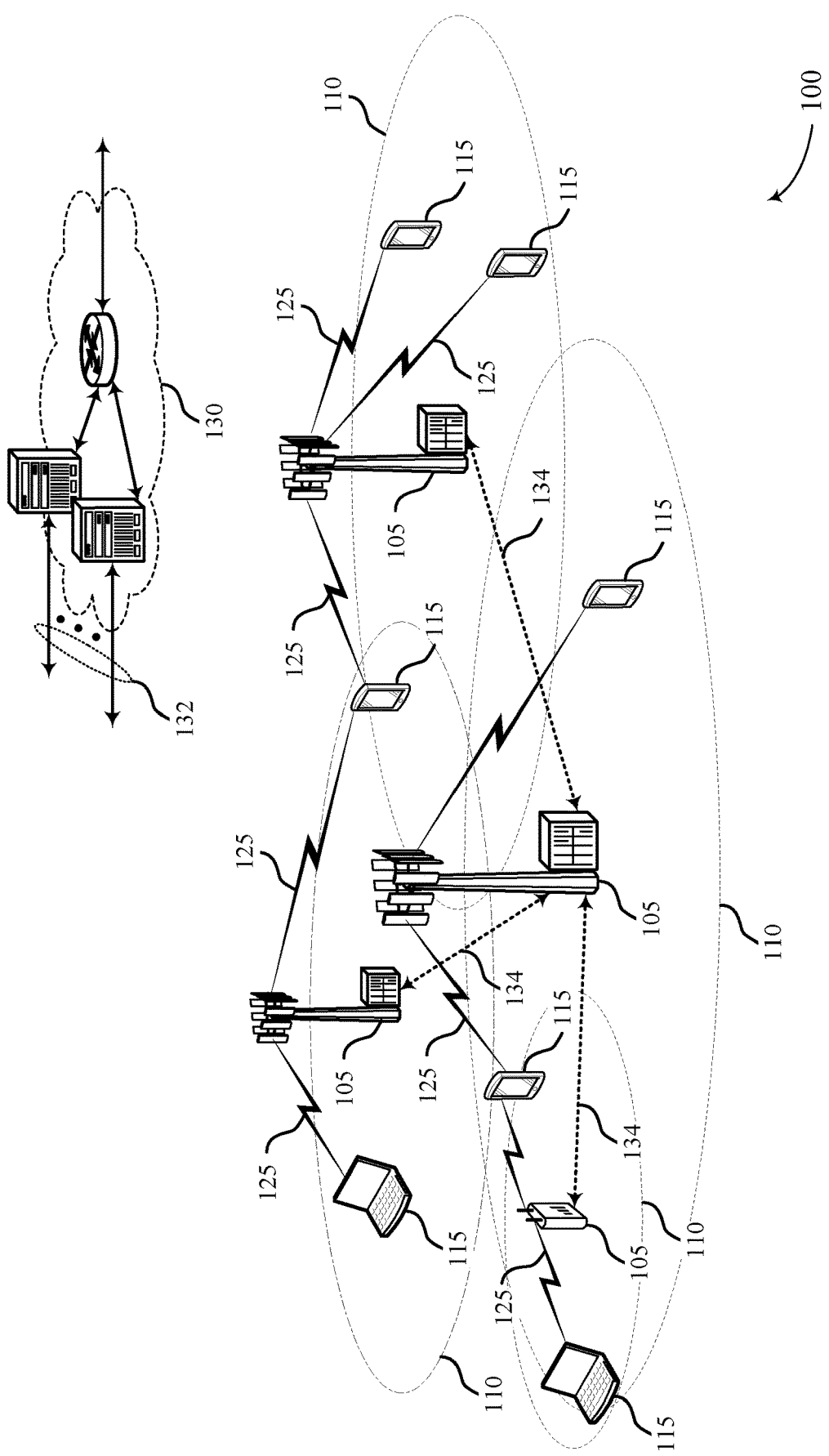
FIG. 1 illustrates an example of a system for wireless communications that supports communicating repetitions of multiple transport blocks scheduled by a single downlink control information (DCI) message as disclosed herein.

A wireless communications system may schedule multiple transport blocks for transmission to a receiving device in a single downlink control information (DCI) message. The wireless communications system may also interleave the transport blocks with repetitions of the transport blocks ("repetitions"). Additionally, the wireless communications system may be configured to perform communications between wireless devices over time-varying frequency resources—e.g., according to a frequency hopping pattern. But transmissions of interleaved transport blocks and repetitions ("interleaved transport blocks") according to a frequency hopping pattern may not provide frequency diversity for one or more of the scheduled transport blocks.

To achieve time and frequency diversity for transport block (TB) transmissions that are scheduled by a single DCI and interleaved with repetitions, a transport block mapping pattern may be determined that ensures frequency diversity for the scheduled transport blocks across the subbands of a frequency hopping pattern by equally (approximately) distributing the interleaved transport blocks across the subbands.

For example, wireless resources (or interleaved transport blocks) may be partitioned into smaller portions (or "subunits") according to the transport block mapping pattern. In some cases, a length of the subunits may be selected to ensure that wireless resources that occur during the subunit span across all of the subbands used in a frequency hopping pattern and include at least one instance of each transport block scheduled by a single DCI message. After partitioning the wireless resources into subunits, a cyclic shift may be applied to one or more of the subunits according to the transport block mapping pattern.

In some cases, invalid resources may be interspersed between the wireless resources used to communicate data between wireless devices based on the occurrence of invalid slots. In some cases, the transport block mapping pattern is modified to accommodate the invalid resources. For example, instances of transport blocks that overlap with invalid subframes may be buffered and transmitted at an end of a transmission of the interleaved transport blocks.

In some cases, the wireless communications system is configured to include scheduling resources throughout a transmission. In some cases, scheduled data is not transmitted during a scheduling resource. In some examples, the transport block mapping pattern may be modified to accommodate the invalid resources. For example, blank transport blocks (or "dummy" transport blocks) may be interleaved with the scheduled transport blocks and repetitions according to the transport block mapping pattern.

Aspects of the disclosure are initially described in the context of a wireless communications system and a wireless communications subsystem. Aspects of the disclosure are also described in the context of an interleaving operation and a mapping operation that support communicating repetitions of multiple transport blocks scheduled by a single DCI message. Aspects of the disclosure are further illustrated by and described with reference to apparatus diagrams, system diagrams, and flowcharts that relate to communicating repetitions of multiple transport blocks scheduled by a single DCI message.

FIG. 1 illustrates an example of a wireless communications system 100 that supports communicating repetitions of multiple transport blocks scheduled by a single DCI message as disclosed herein. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a device such as a cellular phone, a smart phone, a personal digital assistant (PDA), a multimedia/entertainment device (e.g., a radio, a MP3 player, a video device, etc.), a camera, a gaming device, a navigation/positioning device (e.g., GNSS (global navigation satellite system) devices based on, for example, GPS (global positioning system), Beidou, GLONASS, or Galileo, a terrestrial-based device, etc.), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, or the like, which may be implemented in various articles such as appliances, drones, robots, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A wireless communications system 100 may be configured to schedule the transmission of more than one transport block using a single downlink control information DCI message—e.g., a single DCI message that is included in a single control channel may schedule (1) a transmission of multiple physical downlink shared channel (PDSCH) transport blocks from a base station 105 to a UE 115 or (2) a transmission of multiple transport physical uplink shared channel (PUSCH) transport blocks from UE 115 to base station 105. In some cases, the scheduled multiple transport blocks, $TB_x$, may be transmitted over multiple subframes—e.g., $TB_0$ and $TB_1$ may be transmitted over a first subframe and a second subframe, represented as $[TB_0, TB_1]$. In another example, $TB_0$ and $TB_1$ may be transmitted over a first subframe and a fourth subframe, represented as $[TB_0, —, —, TB_1]$. By scheduling multiple transport blocks with a single DCI message, control overhead may be reduced, and throughput may be increased.

A wireless communications system 100 may be configured to transmit copies of each of the multiple transport blocks (or "repetitions"). A transmitting device (e.g., base station 105 or UE 115) may interleave transport blocks with corresponding repetitions during a transmission of the multiple transport blocks—e.g., copies of $TB_0$ and $TB_1$ may be inserted between the transmission of $TB_0$ and $TB_1$, and the interleaved transport blocks may be represented as $[TB_0, TB_1, TB'_0, TB'_1]$. The wireless communications system 100 may map the interleaved transport blocks to communication resources allocated for transmissions between the transmitting and receiving device. Each transport block may correspond and be mapped to communication resources in a valid subframe, where subframes may be associated with an absolute subframe number—e.g., $TB_0$ may be transmitted over a first valid subframe, $SF_0$; $TB_1$ may be transmitted over a second, next valid subframe, $SF_1$; $TB_0$ may be transmitted over a third, next valid subframe, $SF_2$; and $TB'_1$ may be transmitted over a fourth, next valid subframe, $SF_3$.

In some cases, invalid subframes are interspersed between the valid subframes and the transport blocks—e.g., $SF_2$ may be invalid, in which case, $TB_0$ may be transmitted over a first valid subframe, $SF_0$ (or $SF_0^{valid}$); $TB_1$ may be transmitted over a second, next valid subframe, $SF_1$ (or $SF_1^{valid}$); $TB_0$ may be transmitted over a third, next valid subframe, $SF_3$ (or $SF_2^{valid}$); and $TB'_1$ may be transmitted over a fourth, next valid subframe, $SF_4$ (or $SF_3^{valid}$). By interleaving transmissions of transport blocks with transport block repetitions, time diversity may be achieved for transmissions of a transport block, providing robustness against transitory bursts of interference that affect a transmission of a transport block at a first time but not a repetition of the transport block transmitted at a later time.

A wireless communications system 100 may be configured to schedule communications between wireless devices—e.g., between a base station 105 and a UE 115 over different frequency ranges (which may also be referred to as "subbands" or "narrowbands"). That is, the wireless communications system 100 may be configured to schedule communications between wireless devices that use a first subband for a first transmission, a second subband for a subsequent transmission, and so on. The operation of transmitting over different subbands may be referred to as "frequency hopping." In some cases, the transmissions are performed over the different subbands, $SB_y$, according to a "frequency hopping pattern" in which transmissions are performed over the different subbands in a particular order and within a prescribed period. For example, within a period that spans four subframes, a first transmission may be transmitted over $SB_0$ in a first subframe, $SF_0$; a second transmission may be transmitted over $SB_1$ in a second subframe, $SF_1$; a third transmission may be transmitted over $SB_2$ in a third subframe, $SF_2$; and a fourth transmission may be transmitted over $SB_3$ in a fourth subframe, $SF_3$; which may be represented as $[SB_0, SB_1, SB_2, SB_3]$. In some cases, the frequency hopping pattern may be repeated on a periodic basis.

As described above, in some cases, invalid subframes are interspersed between valid subframes. The frequency hopping pattern may operate independently of the presence of invalid or valid subframes. That is, the frequency hopping pattern may be based on an absolute index of the subframes—e.g., if $SF_2$ is invalid, a first transmission may be transmitted over $SB_0$ in $SF_0$; a second transmission may be transmitted over $SB_1$ in $SF_1$; no transmission may be transmitted over $SB_2$ in $SF_2$; a third transmission may be transmitted over $SB_3$ in $SF_3$; and a fourth transmission may be transmitted over $SB_0$ in a fifth subframe, $SF_4$. By scheduling communications over different subbands, frequency diversity may be achieved for transmissions between devices, providing robustness against persistent interference within a particular frequency range that affect a transmission of a first transport block in a first subband but not a repetition of the transport block transmitted in a different subband.

In some cases, a wireless communications system 100 may be configured to schedule multiple transport blocks with a single DCI and transmit the multiple transport blocks after interleaving the transport blocks with one or more repetitions. The wireless communications system 100 may also be configured to transmit the transport blocks and repetitions ("interleaved transport blocks") over different subbands with the goal of achieving both time and frequency diversity.

But, in certain scenarios, combining these two techniques may not result in frequency diversity for transmissions of transport blocks and repetitions. For example, if two transport blocks are interleaved as follows $[TB_0, TB'_1, TB'_0, TB_1]$ and transmissions are scheduled to hop between one of two subbands every subframe (e.g., $[SB_0, SB_1, SB_0, SB_1]$), then the transport block transmission may not achieve frequency diversity. That is, $TB_0$ may be transmitted over $SB_0$ in a first subframe and $TB'_0$ may be transmitted over $SB_0$ in a third subframe. While, $TB_1$ and $TB'_1$ may similarly each be transmitted over $SB_1$ in second and fourth subframe, respectively. Thus, transmissions of the instances of the transport blocks and their corresponding transmissions may be performed over a single subband even when frequency hopping is used.

To achieve time and frequency diversity for transport block transmissions that are scheduled by a single DCI and interleaved with repetitions, a wireless communications system 100 may use a transport block mapping pattern that ensures that, over a number of subframes, the transport blocks and repetitions are equally distributed (approximately) across the subbands used for frequency hopping.

As described above, a frequency hopping pattern used by a wireless communications system 100 may be based on absolute subframe indices. Thus, a frequency hopping pattern may switch from one subband to a next subband in an invalid subframe if the absolute index of the invalid subframe corresponds to the next subband based on the frequency hopping pattern. At the same time, an operation used by the wireless communications system 100 for mapping transport blocks to communication resources may be based on valid subframe indices. In some cases, the transport block mapping pattern used by the wireless communications system 100 similarly maps processed interleaved transport blocks to communication resources based on valid subframe indices. Thus, the mapping operation may skip invalid subframes during the mapping of interleaved transport blocks to communication resources. The imbalance between the operation of the frequency hopping pattern and the transport block mapping pattern may result in a decrease in frequency diversity for one or more of the scheduled transport blocks.

To harmonize the operation of the frequency hopping pattern and the transport block mapping pattern in the presence of invalid subframes, the wireless communications system 100 may perform additional processing for transport blocks of the interleaved transport blocks that correspond to invalid subframes.

Although the above is described in the context of subframes, the concept described above and herein may be similarly described in the context of slots.

Figure 2:
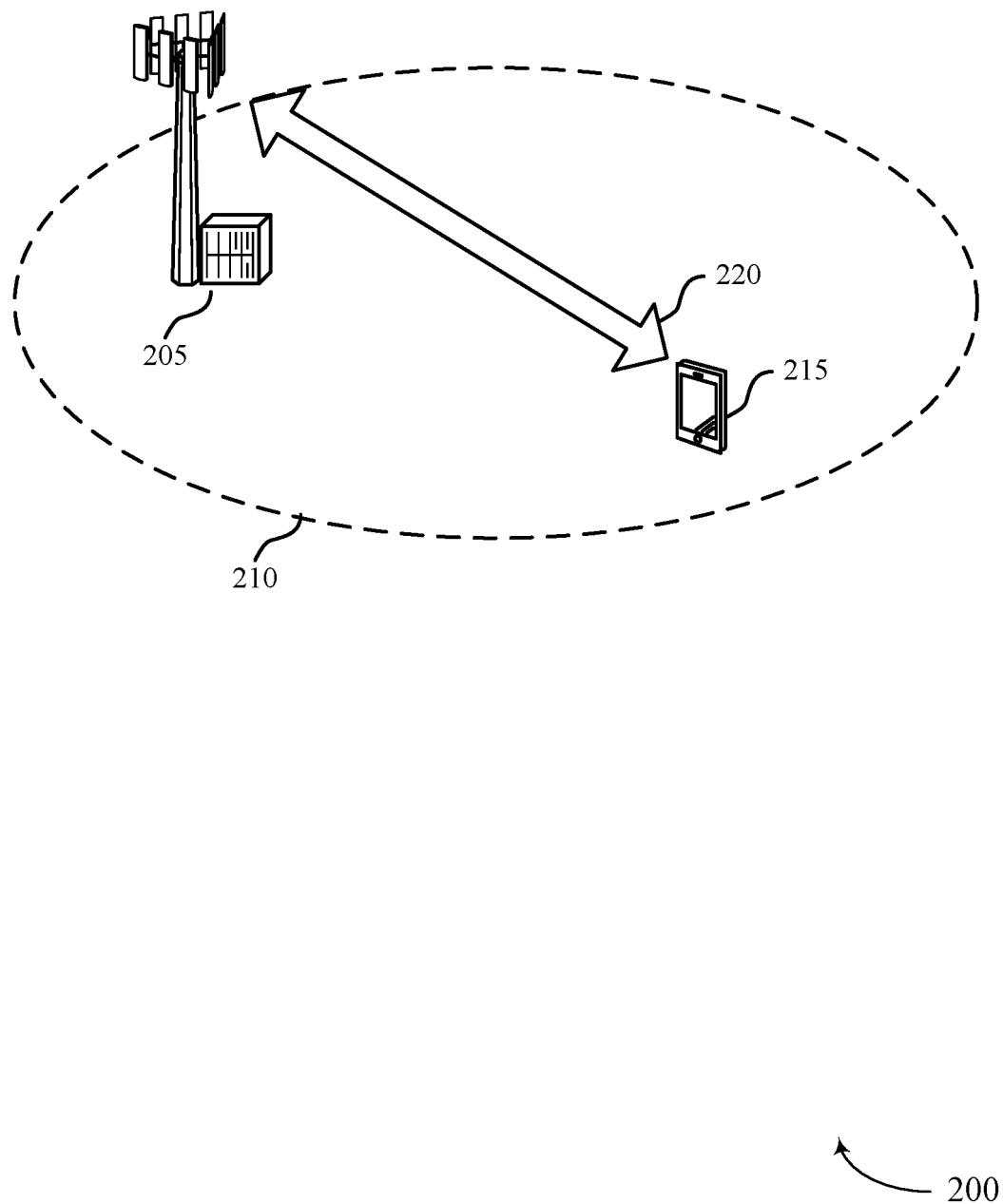
FIG. 2 illustrates aspects of a wireless communications subsystem that supports communicating repetitions of multiple transport blocks scheduled by a single DCI message as disclosed herein.

FIG. 2 illustrates aspects of a wireless communications subsystem that supports communicating repetitions of multiple transport blocks scheduled by a single DCI message as disclosed herein.

Wireless communications subsystem 200 may include base station 205, which may be an example of a base station 105 of FIG. 1; and UE 215, which may be an example of a UE 115 of FIG. 1. Base station 205 and UE 215 may communicate with one another within coverage area 210 over wireless link 220 as described above with reference to FIG. 1. In some cases, base station 205 and UE 215 may communicate with one another over wireless link using FDD transmissions. During FDD transmissions, base station 205 may transmit to UE 215 over a first frequency range, and UE 215 may simultaneously transmit to base station 205 over a second frequency range. In other cases, base station 205 and UE 215 may communicate with one another using TDD transmissions. During TDD transmissions, base station 205 may transmit to UE 215 during a first time period (e.g., during a first set of downlink subframes), and UE 215 may transmit to base station 205 over a second time period (e.g., during a second set of uplink subframes).

As described above and herein, transmitting repetitions of multiple transport blocks scheduled by a single DCI message according to a frequency hopping pattern may not provide frequency diversity for the transport blocks—e.g., based on a frequency hopping pattern that results in each instance of one or more of the transport blocks to be transmitted over a same subband. To achieve both time and frequency diversity for transmissions of the scheduled transport blocks, a wireless communication system may map the transport blocks and repetitions of the transport blocks to wireless resources according to a mapping pattern that ensures that the transmission of the transport block benefit from both time and frequency diversity.

For example, base station 205 may identify that there is data for UE 215 present at base station 205. After identifying the data, base station 205 may form multiple transport blocks, including at least a portion of the data. Base station 205 may also form a single DCI message that schedules a number of the multiple transport blocks, $N_{sched}$, for transmission to UE 215—i.e., the single DCI message may schedule the transmission of multiple PDSCH transport blocks. In some cases, each of the scheduled transport blocks may be associated with a transport block index, $I_{TB}$. In some cases, the single DCI message may schedule the transmission of multiple transport blocks from UE 215 to base station 205—i.e., the single DCI message may schedule the transmission of multiple PUSCH transport blocks. In some cases, UE 215 may determine a value of $N_{sched}$ based on interpreting a weight of a HARQ bitmap.

Before transmitting the transport blocks to UE 215, base station 205 may input the transport blocks into an interleaver. The interleaver may interleave the transport block with repetitions of the transport blocks (or "repetitions"). The number of repetitions, $N_{TB}^{reps}$, may be determined by the wireless communications subsystem 200 or base station 205 e.g., based on known or expected channel conditions, a technology used by UE 215, etc. In some cases, each repetition may be associated with the transport block index of the transport block corresponding to the repetition. In some cases, the interleaving may also be based on an interleaving granularity, $N_{IL}$, which may be associated with the number of repetitions of a transport block that are consecutively transmitted before repetitions associated with a next transport block are transmitted. For example, if $N_{Sched}$=2, $N_{TB}^{reps}$=3, $N_{IL}$=1, then the interleaver may interleave the transport blocks as follows [$TB_1$, $TB_2$, $TB_1$, $TB_2$, $TB_1$, $TB_2$, $TB_1$, $TB_2$]. While if $N_{Sched}$=2, $N_{TB}^{reps}$=3, $N_{IL}$=2, then the interleaver may interleave the transport blocks as follows [$TB_1$, $TB_1$, $TB_2$, $TB_2$, $TB_1$, $TB_1$, $TB_2$, $TB_2$]. In some cases, a value of $N_{IL}$ may be communicated to UE 215 in RRC signaling. In some examples, $N_{IL}$ may depend on whether UE 215 is configured in a first or a second coverage enhancement (CE) mode (e.g., CE Mode A or CE Mode B).

After interleaving the transport blocks with the repetitions, base station 205 may partition the interleaved transport blocks and repetitions (or "interleaved transport blocks") into subunits based on a frequency hopping pattern that is enabled for transmissions between base station 205 and UE 215, the number of transport blocks scheduled by the single DCI message, and an interleaving granularity used by the interleaver. A frequency hopping pattern used by base station 205 and UE 215 may include a number of frequency hops across the same number of subbands (or "narrowbands"), $N_{NB,hop}^{ch,DL}$ and a hopping interval, $N_{NB}^{ch,DL}$, that determines the number of subframes in which base station 205 will transmit over a subband before transmitting subsequent transmissions over a next subband in the frequency hopping pattern. For example, if $N_{NB,hop}^{ch,DL}$=2 and $N_{NB}^{ch,DL}$=1, then base station 205 will transmit over the first subband for one (1) subframe and the second subband for one (1) subframe—e.g., the frequency hopping pattern may be represented as [$NB_1$, $NB_2$]. While if $N_{NB,hop}^{ch,DL}$=2 and $N_{NB}^{ch,DL}$=2, then base station 205 will transmit over the first subband for two (2) subframes and the second subband for two (2) subframes—e.g., the frequency hopping pattern may be represented as [$NB_1$, $NB_1$, $NB_2$, $NB_2$]. The full interval for transmitting across each of the subbands in the frequency hopping pattern may be determined by computing $N_{NB}^{ch,DL} * N_{NB,hop}^{ch,DL}$ hop. The frequency hopping pattern may be repeated at the end of every full interval—i.e., the full interval may be a periodic interval.

To determine the length of a subunit (in subframes), base station 205 may calculate the least common multiple of (1) the number of scheduled transport blocks multiplied by the number of consecutive repetitions transmitted by base station 205 and (2) the number of subframes included in the full frequency hopping interval—e.g., by computing LCM [($N_{sched}*N_{IL}$), $N_{NB}^{ch,DL}*N_{NB,hop}^{ch,DL}$)]. Base station 205 may then partition the interleaved transport blocks into the subunits based on the determined length of the subunits. In some cases, the subunits may be associated with indices and may be periodic in nature. To determine a number of subunits within a larger period, the base station 205 may compute $$GCF\left(N_{sched}, \left\lceil \frac{N_{NB}^{ch,DL} * N_{NB}^{ch,DL}}{N_{IL}} \right\rceil\right).$$

After partitioning the interleaved transport blocks into the subunits, base station 205 may determine whether to apply a cyclic shift to the interleaved transport blocks in one or more of the subunits. In some cases, base station 205 determines that a cyclic shift should be applied to one or more of the subunits. For example, base station 205 may apply a cyclic shift to the interleaved transport blocks in one or more subunits based on determining that transmitting the interleaved transport blocks according to the frequency hopping pattern will result in a frequency diversity for at least one of the scheduled transport blocks that is below a frequency diversity threshold. In another example, base station 205 may apply the cyclic shift based at least in part on determining that, for at least one of the scheduled transport blocks, the number of instances of the transport block (i.e., $N_{TB}^{reps}$+1) divided by the number of frequency subbands is below a frequency diversity rate. Thus, base station 205 may apply a cyclic shift to one or more subunits in a manner that increases the frequency diversity for the at least one scheduled transport blocks without decreasing the frequency diversity of the remaining scheduled transport blocks below a frequency diversity threshold. In yet other examples, base station 205 may apply the cyclic shift based at least in part on determining that a frequency hopping pattern and transport block pattern are synchronized with one another—e.g., [$TB_1$, $TB_2$, $TB_1$, $TB_2$, . . . ] and [$NB_1$, $NB_2$, $NB_1$, $NB_2$, . . . ]. By applying a cyclic shift to a subunit, the transport block indices may be shifted so that different transport blocks are mapped to resources that use different subbands than the subbands used by the transport blocks in a previous subunit.

In other cases, base station 205 may determine that a cyclic shift should not be applied to any of the subunits. For example, base station 205 may determine not to apply a cyclic shift based on determining that a frequency diversity for each of the transport blocks is above a threshold or that a frequency diversity rate of each of the transport blocks is above a frequency diversity rate. In other examples, base station 205 may determine not to apply a cyclic shift based on determining that a frequency hopping and transport block pattern are asynchronous—e.g., [TB$_1$, TB$_2$, TB$_1$, TB$_2$, TB$_1$, TB$_2$, . . . ] and [NB$_1$, NB$_2$, NB$_3$, NB$_1$, NB$_2$, NB$_3$, . . . ].

In some cases, base station 205 may take into account the above considerations and determine whether to apply the cyclic shift based on computing $$\left[1 \bmod GCF\left(N_{sched}, \left\lceil \frac{N_{NB}^{ch,DL} * N_{NB,hop}^{ch,DL}}{N_{IL}} \right\rceil \right)\right] * \left\lceil \frac{N_{NB}^{ch,DL}}{N_{IL}} \right\rceil.$$

That is, base station 205 may refrain from applying a cyclic shift when (1) the number of scheduled transport blocks and (2) the quotient of dividing the number of subframes included in the full frequency hopping interval divided by the interleaving granularity are co-prime—i.e., when the greatest common factor of the first and second values is equal to 1. Alternatively, base station 205 may apply a cyclic shift when the greatest common factor of the first and second values is any value greater than 1, where the value of the cyclic shift is equivalent to $$\left\lceil \frac{N_{NB}^{ch,DL}}{N_{IL}} \right\rceil.$$

In some cases, the cyclic shift may be applied to each transport block index in each successive subunit.

After partitioning the interleaved transport blocks into subunits and applying any cyclic shifts to the subunits, base station 205 may map the interleaved transport blocks to communication resources that are allocated to the UE and configured according to the frequency hopping pattern. In some cases, mapping the interleaved transport blocks may include aligning the beginning of the interleaved transport blocks with a starting subframe so that N$_{IL}$ successive subframes (starting from the starting subframe with index 0) have a same transport block index. After the aligning, the remaining interleaved transport blocks may be successively mapped to the communication resources. In some cases, the transport block index associated with a communication resource that is located in a particular subframe, i, may be determined by calculating Equation 1 (shown below).

Equation 1

$$I_{TB}(i) =$$

$$\left(\left\lfloor \frac{i}{N_{IL}} \right\rfloor + \left\lfloor \frac{i}{LCM\left[\begin{matrix}(N_{sched} * N_{IL}),\\(N_{NB}^{ch,DL} * N_{NB,hop}^{ch,DL})\end{matrix}\right]} \right\rfloor * \left(1 \bmod GCF\left(N_{sched}, \left\lceil \frac{N_{NB}^{ch,DL} * N_{NB,hop}^{ch,DL}}{N_{IL}} \right\rceil \right)\right) * \left\lceil \frac{N_{NB}^{ch,DL}}{N_{IL}} \right\rceil\right) \bmod N_{sched},$$

where $I_{TB}(i) \in \{0, \ldots, N_{Sched} - 1\}$

In some cases, the operation $$\left\lfloor \frac{i}{N_{IL}} \right\rfloor$$

in Equation 1 may represent the alignment of the interleaved transport blocks with a starting subframe so that N$_{IL}$ successive subframes have a same transport block index. In some cases, the operation $$\left\lfloor \frac{i}{N_{IL}} \right\rfloor$$

also ensures that N$_{IL}$ successive instances of a scheduled transport block are mapped to communication resources.

Figure 4:
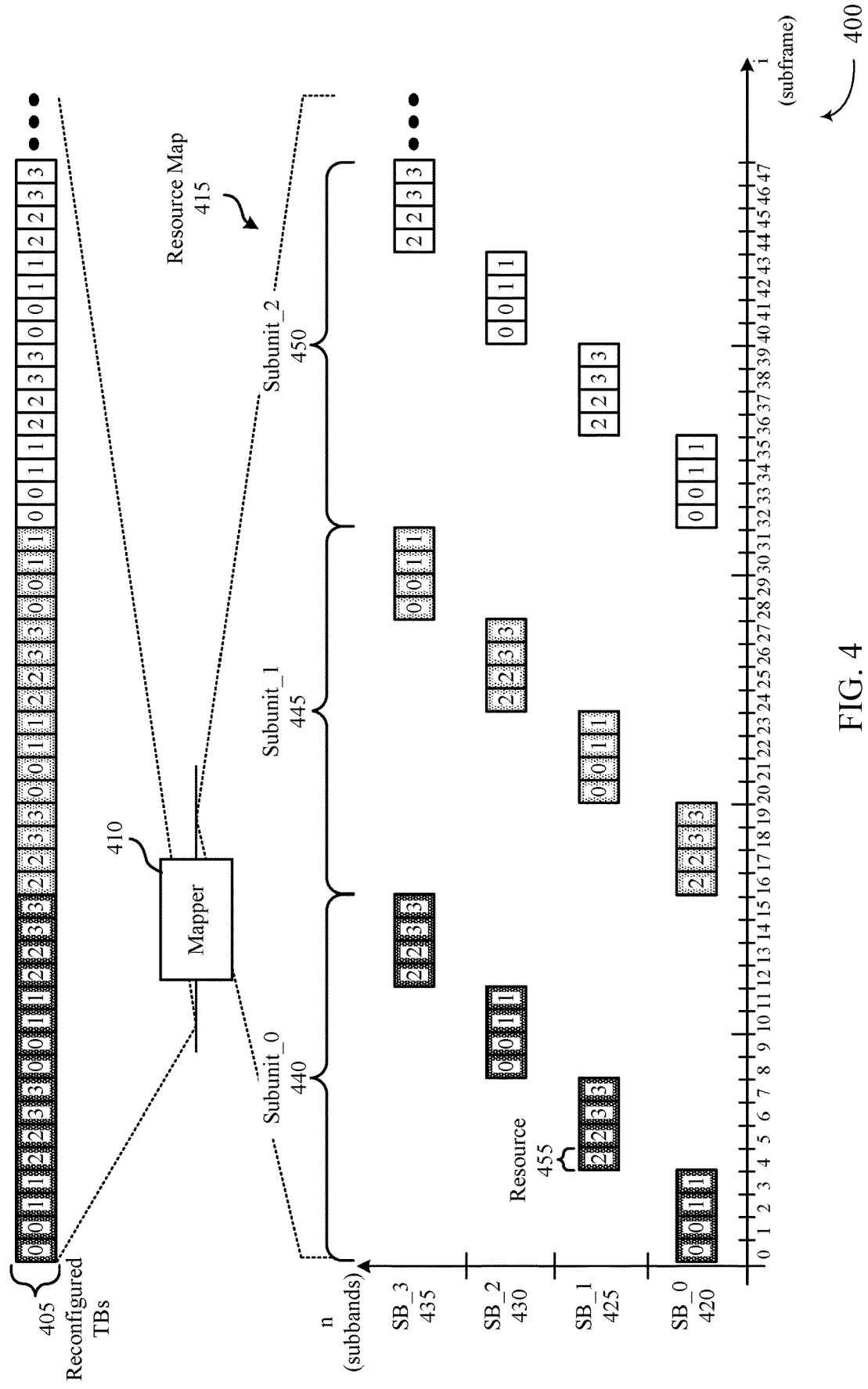
FIGS. 4-7 illustrate aspects of mapping operations for communicating repetitions of multiple transport blocks scheduled by a single DCI message as disclosed herein.

After the mapping the interleaved transport blocks to the communication resources, as described in more detail herein and with reference to FIG. 4, base station 205 may transmit the transport blocks and repetitions to UE 215. In some cases, transmitting the transport blocks includes transmitting a single DCI message in control channel resources and the transport blocks in data channel resources, where the DCI may schedule the transmission of the scheduled transport blocks and indicate to UE 215 a location of the transport block in the data channel resources. In some case, the DCI may also include an indication of a frequency hopping pattern used for transmissions between base station 205 and UE 215 and/or an indication of an interleaving granularity used by base station 205. In other cases, base station 205 may signal the indication of the frequency hopping pattern and/or interleaving granularity to UE 215 using RRC signaling before the DCI message or interleaved transport blocks are transmitted to UE 215.

In some cases, the transport block mapping pattern achieves a frequency diversity for each transport block so that the respective frequency diversities are within a percent difference of one another (e.g., within 15%).

In some examples, UE 215 may be similarly configured to interleave transport blocks and map interleaved transport blocks to uplink (UL) communication resources for transmissions of multiple PUSCH transport blocks to base station 205 that are scheduled by a single DCI message.

UE 215 may receive the interleaved transport blocks over the communication resources based at least in part on receiving the single DCI message, a frequency hopping pattern used by base station 205 and UE 215, and a configured interleaving granularity. In some cases, after receiving the DCI message and before receiving and/or decoding the interleaved transport blocks, UE 215 determines a transport block index associated with each of the communication resources. In other cases, UE 215 determines a transport block index associated with each of the communication resources after receiving and/or decoding signals over the communication resources.

To determine a transport block index of a particular communication resource that occurs within a particular subframe, UE 215 may calculate Equation 1 for the particular communication resource. That is, UE 215 may partition the communication resources into subunits after determining the length of the subunits by computing LCM[(N$_{sched}$*N$_{IL}$), (N$_{NB}^{ch,DL}$*N$_{NB,hop}^{ch,DL}$)]. UE 215 may also determine a periodicity of the subunits based on computing $$GCF\left(N_{sched}, \left\lceil \frac{N_{NB}^{ch,DL} * N_{NB,hop}^{ch,DL}}{N_{IL}} \right\rceil \right).$$

After partitioning the communication resources into subunits, UE 215 may determine whether base station 205 applied a cyclic shift to any of the subunits by computing $$\left\lfloor 1 \bmod GCF\left(N_{sched}, \left\lceil \frac{N_{NB}^{ch,DL} * N_{NB,hop}^{ch,DL}}{N_{IL}} \right\rceil\right)\right\rfloor * \left\lceil \frac{N_{NB}^{ch,DL}}{N_{IL}} \right\rceil.$$

If UE 215 determines that 1) the number of scheduled transport blocks and (2) the quotient of dividing the number of subframes included in the full frequency hopping interval divided by the interleaving granularity are co-prime, then UE 215 may conclude that cyclic shift hasn't been applied to at least one subunit. Otherwise, if UE 215 determines that the greatest common factor of the first and second values is greater than 1, UE 215 may determine that a cyclic shift was applied to at least one subunit. UE 215 may also determine the communication resource comprising the first transport block of the plurality of transport blocks and having a subframe index of 0 based at least in part on computing $$\left\lfloor \frac{i}{N_{IL}} \right\rfloor.$$

For example, for the first communication resource that occurs after the control resources carrying the DCI message, UE 215 may compute Equation 1 for i=0. In some cases, UE 215 may compute Equation 1 for each communication resource following the control resources carrying the DCI message. In some cases, UE 215 may determine a number of communication resources used by base station 205 to transmit the interleaved transport blocks and may compute Equation 1 up to the number of communication resources following the control resources carrying the DCI message.

In some examples, base station 205 may be similarly configured to determine an index of multiple PUSCH transport blocks that are scheduled by a single DCI message and transmitted to base station 205 from UE 215.

In some cases, invalid subframes may be interspersed between the communication resources used to communicate the interleaved transport blocks between base station 205 and UE 215. Invalid subframes may include (1) TDD UL subframes when base station 205 is transmitting information for multiple PDSCH transport blocks to UE 215; (2) TDD DL subframes when UE 215 is transmitting information for multiple PUSCH transport blocks to base station 205; (3) subframes during which broadcast transmissions are performed; (4) subframes during which transmissions are prohibited (e.g., measurement or blank subframes); and/or (5) subframes used for scheduling ("scheduling subframes" or "gaps").

As described above, an imbalance between the operation of the frequency hopping pattern and the transport block mapping pattern may result in a decrease in frequency diversity for one or more of the scheduled transport blocks. To harmonize the operation of the frequency hopping pattern and the transport block mapping pattern in the presence of invalid subframes, techniques for processing transport blocks of the interleaved transport blocks that correspond with the invalid subframes may be used.

Figure 5:
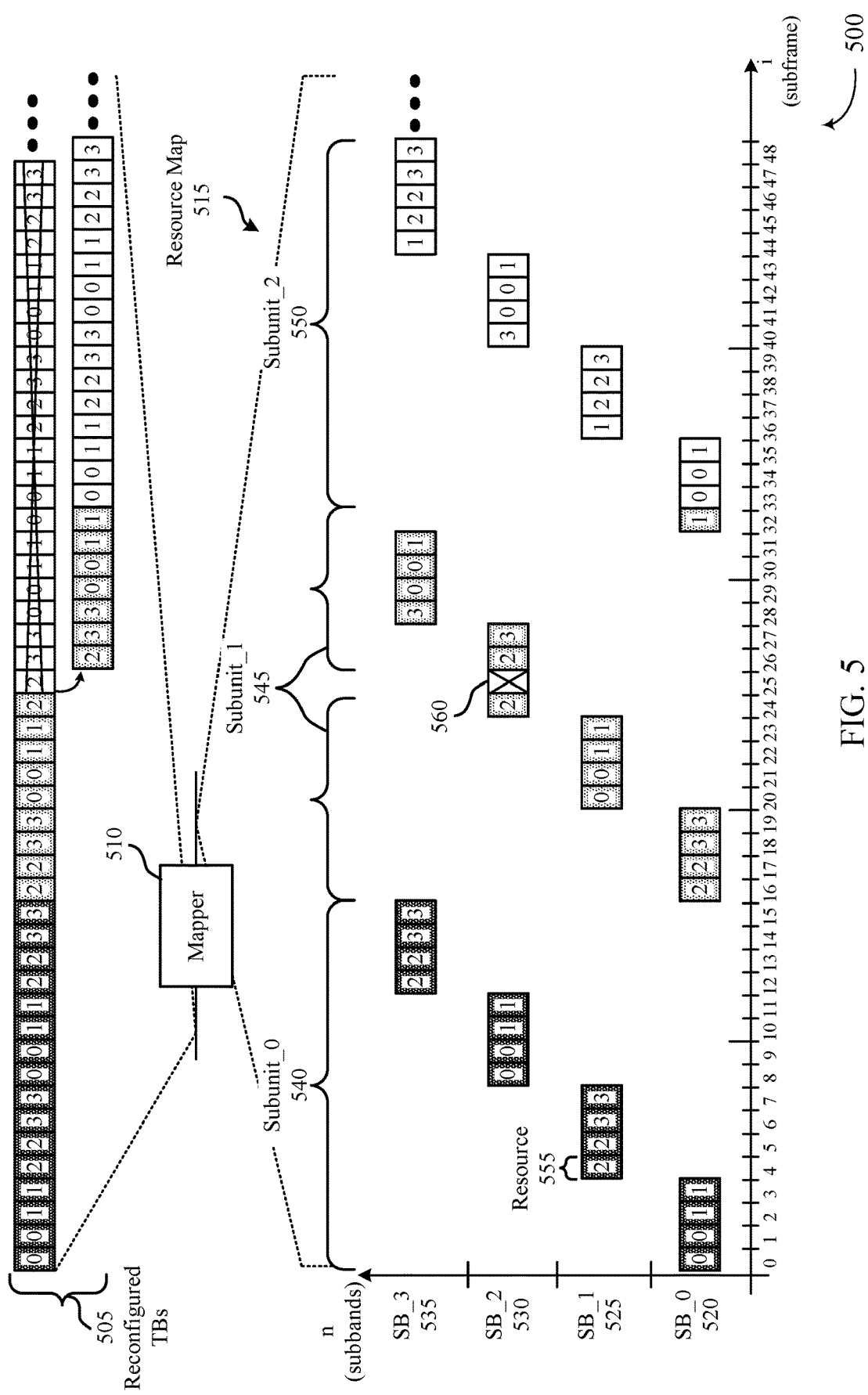

For example, base station 205 may map a transport block that corresponds to an invalid subframe to a next valid subframe, as described in more detail herein and with reference to FIG. 5. This technique may include identifying all of the valid subframes and applying the transport block mapping pattern using the valid subframes i.e., $I_{TB}^{valid}=I_{TB}$ $(i_{valid})$, where $i_{valid}$ sequentially indexes the set of usable subframes and not an absolute subframe number, where $i_{valid}$ $\in \{1, 2, \ldots, N_{data}\}$. By mapping the interleaved transport blocks directly to the valid subframes, base station 205 may be able to apply the transport block mapping pattern without any additional operations.

Figure 6:
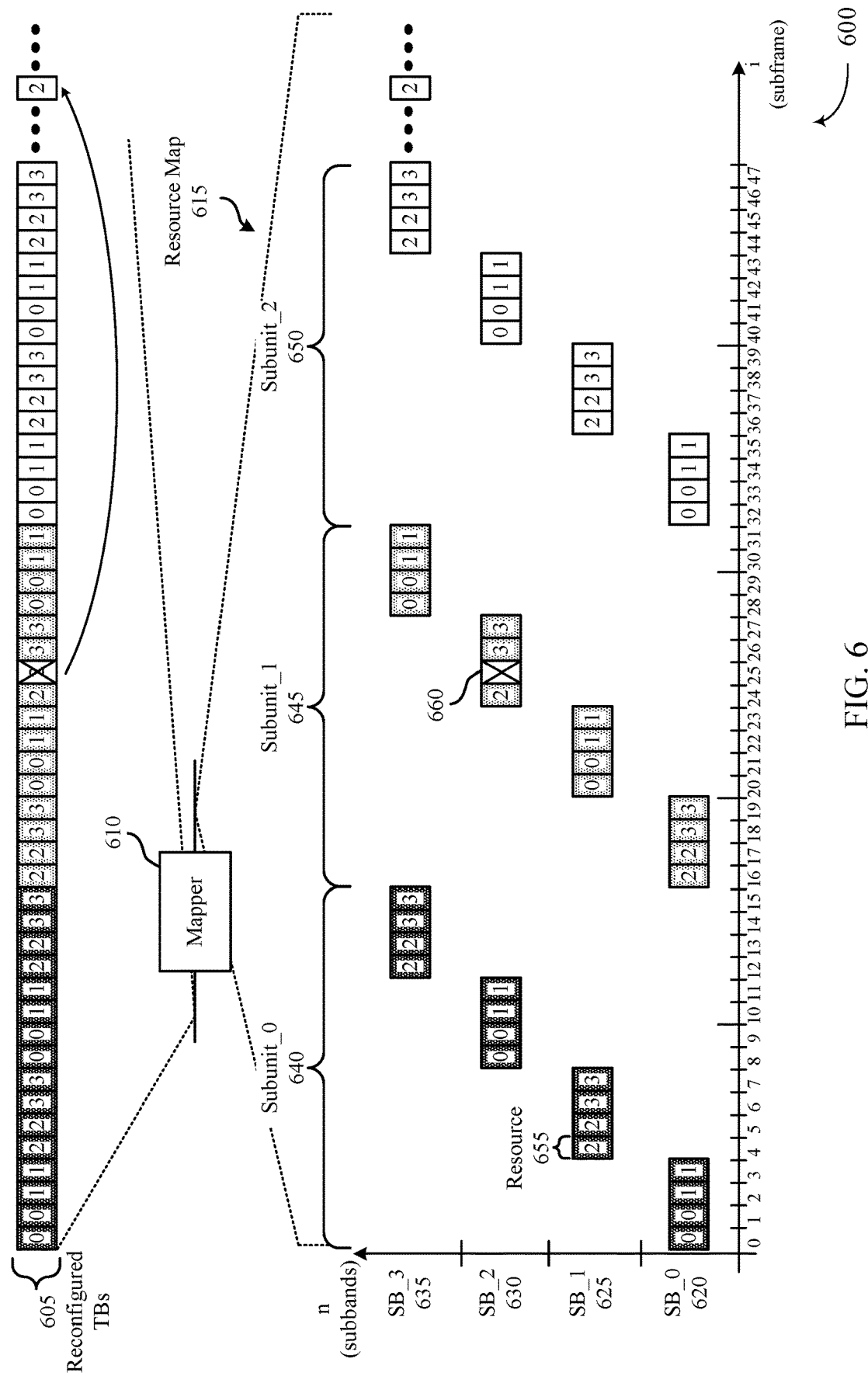

In other examples, base station 205 may identify transport blocks of the interleaved transport blocks that correspond to invalid subframes and may refrain from mapping the identified transport blocks to communications resources and may instead write the transport blocks into a buffer, as described in more detail herein and with reference to FIG. 6. Base station 205 may then perform a direct mapping between the remaining transport blocks and the valid subframes—e.g., the $9^{th}$ transport block may be mapped to the communication resource in the $9^{th}$ subframe, the $10^{th}$ transport block may be buffered based on determining that a communication resource located in the $10^{th}$ subframe is invalid, and the $11^{th}$ transport block may be mapped to the communication resource in the $11^{th}$ subframe. After transmitting the remaining transport blocks, base station 205 may transmit all of the buffered transport blocks over the communication resources according to the frequency hopping pattern—e.g., in the order in, or the opposite order from, which the transport blocks were written to the buffer. This technique may include identifying all of the transport blocks that correspond to valid subframes and all of the transport blocks that correspond to invalid subframes and applying a transport block mapping pattern—i.e., if there are $N_{inv}$ unusable subframes, $\forall i \in \{0, 1, \ldots, N_{data}-1\}$, $I_{TB}^{valid}$ (i)=$I_{TB}$ (i) if subframe i is usable, and if otherwise, $I_{TB}^{valid}$ (i)=INVALID; and $\forall i \in \{N_{data}, \ldots, N_{inv}-1\}$, $I_{TB}^{valid}$ (i)=$X_{inv}$(i-$N_{data}$) where $X_{inv}$ is the absolute subframe index of the kth unusable subframe and k$\in\{1, 2, \ldots, N_{inv}\}$. By buffering the transport blocks corresponding to invalid subframes, the frequency diversity obtained by the transport block mapping pattern may be maintained for the transport blocks corresponding to the valid subframes.

Figure 7:
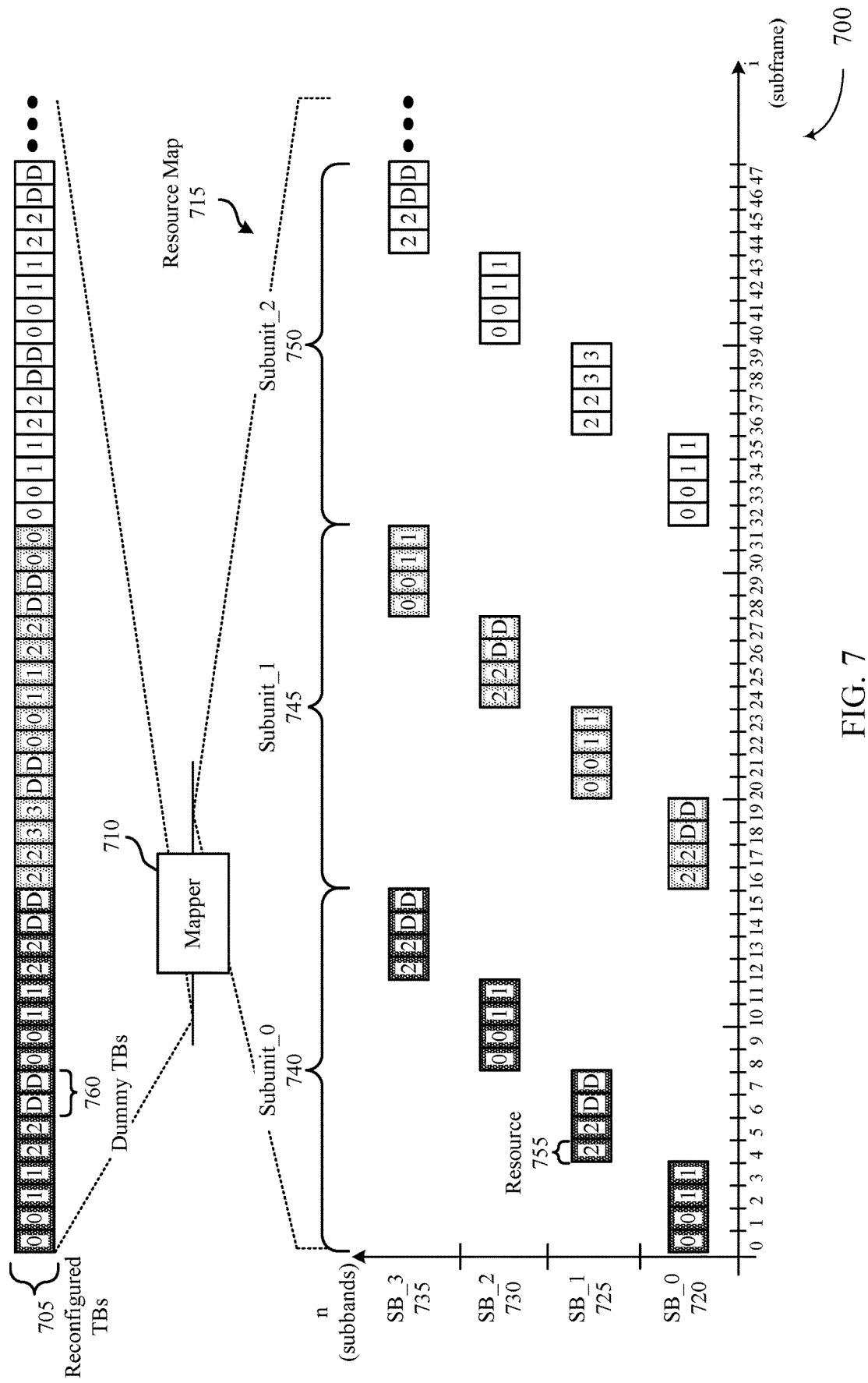

In yet other examples, base station 205 may insert dummy transport blocks into the interleaved transport blocks—e.g., to accommodate scheduling gaps as described in more detail herein and with reference to FIG. 7. In this case, Equation 1 may be rewritten with $N_{sched}$ being replaced by $N_{sched}+\Delta_{gap}$, where $I_{TB}(i) \in \{N_{sched}, \ldots, N_{sched}+\Delta_{gap}+1\}$. In some cases, $\Delta_{gap}$ is equal to one (1) for configurations with a small number of scheduling gaps. In some cases, a parameter corresponding to $\Delta_{gap}$ may be configured in RRC or DCI signaling.

In some cases, if frequency hopping is disabled for communications between base station 205 and UE 215, base station 205 may perform a row-column interleaving where the number of columns are equal to $$\frac{N_{TB}^{reps}}{N_{IL}}.$$

In some examples, if interleaving is disabled for communications between base station 205 and UE 215, base station may transmit $N_{TB}^{reps}$ of the first transport block, $N_{TB}^{reps}$ of the second transport block, and so on.

Figure 3:
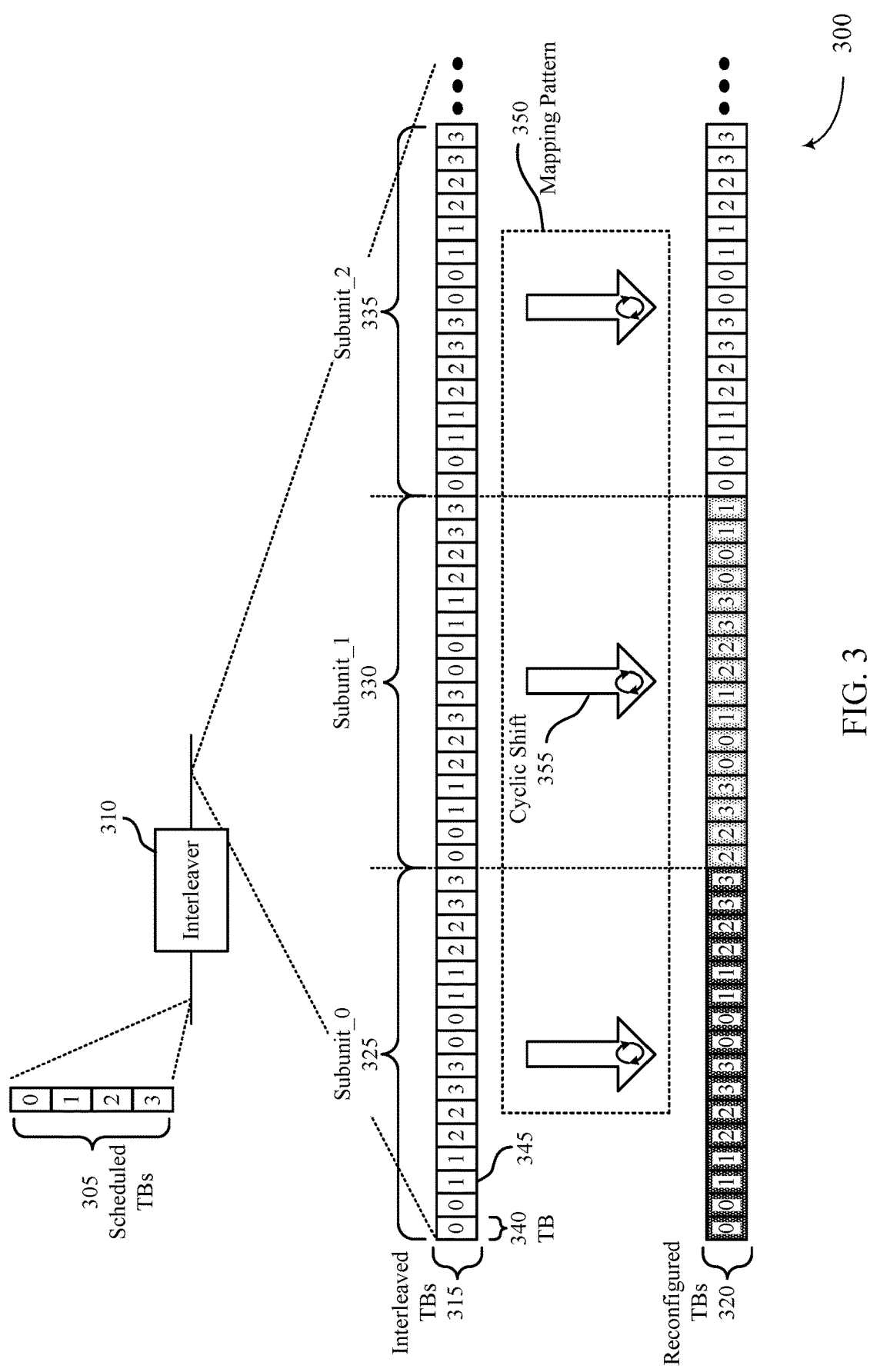
FIG. 3 illustrates aspects of an interleaving operation for communicating repetitions of multiple transport blocks scheduled by a single DCI message as disclosed herein.

FIG. 3 illustrates aspects of an interleaving operation for communicating repetitions of multiple transport blocks scheduled by a single DCI message as disclosed herein.

Interleaving operation 300 may illustrate aspects of interleaving multiple scheduled transport blocks with repetitions. Interleaving operation 300 may include scheduled TBs 305, interleaver 310, interleaved TBs 315, and reconfigured TBs 320. Interleaved TBs 315 and reconfigured TBs 320 may be partitioned into first subunit 325, second subunit 330, and third subunit 335. Interleaved TBs 315, reconfigured TBs 320, and the subunits may be composed of multiple TBs 340. The multiple TBs may include repetitions of scheduled TBs 305 and may each be associated with an index that corresponds to one of scheduled TBs 305. For example, third transport block 345 may be associated with and a repetition of scheduled transport block $TB_1$. Third transport block 345 may also be referred to as an instance of scheduled transport block $TB_1$.

Interleaving operation 300 may also include mapping pattern 350. Mapping pattern 350 may be configured to apply cyclic shifts (e.g., cyclic shift 355) to one or more subunits based on a frequency diversity achieved for each of the scheduled TBs transmitted over frequency hopping resources. The value of a cyclic shift applied to a subunit may be determined based on computing $$\left[1 \bmod GCF\left(N_{sched}, \left\lceil \frac{N_{NB}^{ch,DL} * N_{NB,hop}^{ch,DL}}{N_{IL}} \right\rceil\right)\right] * \left\lceil \frac{N_{NB}^{ch,DL}}{N_{IL}} \right\rceil.$$

In some cases, interleaving operation 300 is performed by a base station transmitting multiple transport blocks scheduled by a single DCI to a UE—e.g., multiple PDSCH transport blocks. In other cases, interleaving operation 300 is performed by a UE transmitting multiple transport blocks scheduled by a single DCI to a base station—e.g., multiple PUSCH transport blocks.

In some examples, interleaved TBs 315 are processed by mapping pattern 350. Mapping pattern 350 may partition interleaved TBs 315 into first subunit 325, second subunit 330, and third subunit 335. Mapping pattern 350 may then determine whether to apply a cyclic shift to any of first subunit 325, second subunit 330, and third subunit 335. In some cases, mapping pattern 350 determines whether to apply a cyclic shift to the subunits based on determining whether a frequency diversity achieved for any of scheduled TBs 305 is below a threshold. That is, mapping pattern 350 may not apply any cyclic shifts if the frequency diversity associated with all of the instances of the first scheduled transport block is above a threshold, if the frequency diversity associated with all of the instances of the second scheduled transport block is above a threshold, and so on.

In other cases, mapping pattern 350 determines whether to apply a cyclic shift to one or more of first subunit 325, second subunit 330, and third subunit 335 based on computing $$\left(\left\lceil \frac{i}{LCM\left[(N_{shced} * N_{IL}), (N_{NB}^{ch,DL} * N_{NB,hop}^{ch,DL})\right]} \right\rceil * \left(1 \bmod GCF\left(N_{sched}, \left\lceil \frac{N_{NB}^{ch,DL} * N_{NB,hop}^{ch,DL}}{N_{IL}} \right\rceil\right)\right) * \left\lceil \frac{N_{NB}^{ch,DL}}{N_{IL}} \right\rceil\right),$$

where i may correspond to an index of the transport blocks included in interleaved TBs 315. For example, mapping pattern 350 may apply a cyclic shift to all of the transport blocks in second subunit 330 based on computing the above equation for $\forall i=\{16 \ldots 31\}$, where the value of the cyclic shift may be equal to the result of the computation in FIG. 3, the value of cyclic shift 355 may be equal to two (2). In some cases, mapping pattern 350 similarly applies a cyclic shift to first subunit 325 and third subunit 335; however, a value of the cyclic shift applied to first subunit 325 may be equal to zero (0) and a value of the cyclic shift applied to third subunit 335 may be equal to the number of scheduled transport blocks in FIG. 3, the value of the cyclic shift applied to third subunit 335 may be equal to four (4). In other examples, mapping pattern 350 may refrain from applying a cyclic shift to any of first subunit 325, second subunit 330, and third subunit 335 based on determining that the values of $N_{sched}$ and $$\left\lceil \frac{N_{NB}^{ch,DL} * N_{NB,hop}^{ch,DL}}{N_{IL}} \right\rceil$$

are co-prime. In some cases, mapping pattern 350 may be applied within a mapping component that receives interleaved TBs 315 before the mapping component maps reconfigured TBs 320 to communication resources.

Reconfigured TBs 320 may be generated after applying the mapping pattern 350. In some cases, reconfigured TBs 320 may then be mapped to communication resources based on a frequency hopping pattern.

In some examples, each of the scheduled TBs 305 is scheduled to be transmitted across multiple resources (e.g., across a set of aggregated slots). Prior to mapping the scheduled TBs 305 to a set of resources, the extended transport blocks may be interleaved with one another, yielding interleaved TBs 315. In such cases, the repetitions of a scheduled transport block may refer to a portion (e.g., a unique portion) of an extended transport block that is transmitted over a resource (or basic unit), rather than to a redundant version of a transport block. Cyclic shifts may be similarly applied to the interleaved version of the extended transport blocks to ensure that frequency diversity is achieved (or to increase frequency diversity) for the scheduled transport blocks.

FIG. 4 illustrates aspects of a mapping operation for communicating repetitions of multiple transport blocks scheduled by a single DCI message as disclosed herein.

Mapping operation 400 may illustrate aspects of mapping reconfigured transport blocks to communication resources. Mapping operation 400 may include reconfigured TBs 405. Reconfigured TBs 405 may be an output of an interleaving operation and the application of a mapping pattern. Reconfigured TBs 405 may be an example of reconfigured TBs 320 of FIG. 3.

Mapping operation 400 may include mapper 410 and resource map 415. Resource map 415 may be partitioned in frequency into subbands (e.g., first subband 420, second subband 425, third subband 430, and fourth subband 435) and subframes. In some cases, resource map 415 may also be partitioned into subunits (e.g., first subunit 440, second subunit 445, and third subunit 450). Resource map 415 may include multiple resources 455. Resources 455 may occupy wireless spectrum (e.g., a frequency range within a subband) for a particular interval of time (e.g., a subframe).

Mapper 410 may map reconfigured TBs 405 to resources 455. In some cases, mapper 410 performs a direct mapping between reconfigured TBs 405 and resources 455. That is, mapper 410 may map the first reconfigured transport block (e.g., $TB_0$) to the first communication resource, the second reconfigured transport block (e.g., $TB_0$) to the second communication resource, the third reconfigured transport block (e.g., $TB_1$) to the communication third communication resource, and so on. In some cases, resources 455 are configured according to a frequency hopping pattern. In some cases, the frequency hopping pattern may be used by a transport block mapping pattern to generate reconfigured TBs 405. In other cases, mapper 410 may use the frequency hopping pattern to apply the transport block mapping pattern to interleaved transport blocks, such as interleaved TBs 315 of FIG. 3, before mapping reconfigured TBs 405 to resource map 415. In some cases, resources 455 may be allocated for communications between a particular UE and base station.

A receiving device that receives transmissions over resource map 415 may identify a transport block index associated with each of resources 455 based on computing Equation 1 for each subframe.

FIG. 5 illustrates aspects of a mapping operation for communicating repetitions of multiple transport blocks scheduled by a single DCI message as disclosed herein.

Mapping operation 500 may illustrate aspects of mapping reconfigured transport blocks to communication resources. Mapping operation 500 may include reconfigured TBs 505. Reconfigured TBs 505 may be an output of an interleaving operation and the application of a mapping pattern. Reconfigured TBs 505 may be an example of reconfigured TBs 320 or reconfigured TBs 405 of FIGS. 3 and 4. Mapping operation 500 may include mapper 510, which may be an example of and similarly configured as mapper 410 of FIG. 4. Mapping operation 500 may include resource map 515.

Resource map 515 may be partitioned in frequency into first subband 520, second subband 525, third subband 530, and fourth subband 535. Resource map 615 may be partitioned in time into subframes. Resource map 515 may also be partitioned in time into first subunit 540, second subunit 545, and third subunit 550. Resource map 515 may include resources 555, which may be an example of resources 455 of FIG. 4.

In some cases, resource map 515 may include subframes during which communication between a particular UE and base station are not usable. These subframes may be referred to as invalid subframes. Mapper 510 may be prevented from mapping a reconfigured TB to resources 555 that occur during invalid subframes (e.g., invalid resource 560).

In some examples, mapper 510 may perform a direct mapping of reconfigured TBs 505 to resources 555 that are valid. That is mapper 510 may consecutively map reconfigured TBs to resources 555 that are valid. When mapper 510 encounters invalid resource 560, mapper 510 may wait until the next subframe to map the reconfigured transport block associated with invalid resource 560—e.g., the reconfigured transport block resource having a same reconfigured transport block index as the invalid subframe index (the $26^{th}$ reconfigured transport block). Thus, mapper 510 may map the reconfigured transport block associated with invalid resource 560 to the resource in the $27^{th}$ subframe. Accordingly, second subunit 545 may be split into two different parts across the communication resources in resource map 515 to exclude the invalid resource. The waiting period observed by mapper 510 may be represented by shifting all of the reconfigured transport blocks starting with the reconfigured transport block associated with the invalid resource by the length of one transport block. In some cases, this shifting is actually performed (e.g., by an interleaver) and a blank transport block is inserted at the reconfigured transport block location associated with the invalid subframe. In other cases, the shifting is not actually performed but functionally occurs based on mapper 510 waiting to map the reconfigured transport block resource associated with the invalid subframe. By directly mapping the reconfigured TBs 505 to resources 555 that are valid, a computational load at the transmitting device may be reduced.

As described above, a frequency hopping pattern may operate based on absolute subframe indices and independently of the validity of subframes while a transport block mapping pattern may operate based on valid subframe indices. Accordingly, the index of a reconfigured transport block and the subframe in which the reconfigured transport block is mapped to a resource may lose alignment in the presence of invalid subframes. This misalignment may result in the frequency diversity for a scheduled transport block to be decreased relative to if the indices of reconfigured TBs 505 and the absolute subframe indices remained aligned.

A receiving device that receives transmissions over resource map 515 may identify a transport block index associated with each of resources 555 based on computing Equation 1 for each valid subframe.

FIG. 6 illustrates aspects of a mapping operation for communicating repetitions of multiple transport blocks scheduled by a single DCI message as disclosed herein.

Mapping operation 600 may illustrate aspects of mapping reconfigured transport blocks to communication resources. Mapping operation 600 may include reconfigured TBs 605. Reconfigured TBs 605 may be an output of an interleaving operation and the application of a mapping pattern. Reconfigured TBs 605 may be an example of reconfigured TBs 320, reconfigured TBs 405, or reconfigured TBs 505 of FIGS. 3 to 5. Mapping operation 600 may include mapper 610, which may be an example of and similarly configured as mapper 410 or mapper 510 of FIGS. 4 and 5. Mapping operation 600 may include resource map 615.

Resource map 615 may be partitioned in frequency into first subband 620, second subband 625, third subband 630, and fourth subband 635. Resource map 615 may be partitioned in time into subframes. Resource map 615 may also be partitioned in time into first subunit 640, second subunit 645, and third subunit 650. Resource map 615 may include resources 655, which may be an example of resources 455 or resources 555 of FIGS. 4 and 5.

In some cases, resource map 615 may include invalid subframes. Mapper 610 may be prevented from mapping a reconfigured transport block to resources 655 that occur during invalid subframes (e.g., invalid resource 660).

Mapper 610 may identify reconfigured transport blocks associated with invalid subframes before mapping reconfigured transport blocks to resource map 615. For example, mapper 610 may determine that the $26^{th}$ reconfigured transport block is associated with invalid resource 660 and invalid subframe_25. Instead of mapping the $26^{th}$ reconfigured transport block in the next valid subframe (e.g., subframe_26), mapper 610 may write the $26^{th}$ reconfigured transport block to a buffer. Mapper 610 may similarly write other reconfigured transport blocks that are associated with invalid subframes to the buffer. After mapping all of the last of the reconfigured transport blocks, mapper 610 may directly map the buffered reconfigured transport blocks to subsequent valid resources. By transmitting the reconfigured transport blocks associated with invalid subframes at the end, frequency diversity for the scheduled transport blocks achieved by the transport block mapping pattern may be maintained.

A receiving device that receives transmissions over resource map 615 may identify a transport block index associated with each resources 655 based on computing Equation 1 for each subframe using an absolute subframe index.

FIG. 7 illustrates aspects of a mapping operation for communicating repetitions of multiple transport blocks scheduled by a single DCI message as disclosed herein.

Mapping operation 700 may illustrate aspects of mapping reconfigured transport blocks to communication resources. Mapping operation 700 may include reconfigured TBs 705. Reconfigured TBs 705 may be an output of an interleaving operation and the application of a mapping pattern. Mapping operation 700 may include mapper 710, which may be an example of and similarly configured as mapper 410, mapper 510, or mapper 610 of FIGS. 4 to 6. Mapping operation 700 may include resource map 715.

Resource map 715 may be partitioned in frequency into first subband 720, second subband 725, third subband 730, and fourth subband 735. Resource map 715 may be partitioned in time into subframes. Resource map 715 may also be partitioned in time into first subunit 740, second subunit 745, and third subunit 750. Resource map 715 may include resources 755, which may be an example of resources 455, resources 555, or resources 655 of FIGS. 4 to 6.

In some cases, scheduling resources are included in resource map 715. In some cases, a base station may be configured to schedule scheduling resources so that a certain number of scheduling resources are included in resource map 715 within a certain period. To support the inclusion of scheduling resources, dummy TBs 760 (or blank transport blocks) may be included in reconfigured TBs 706. Dummy TBs 760 may be transport blocks that do not convey any information (e.g., that contain all zeros). Dummy TBs 760 may be interleaved with scheduled transport blocks, as described herein and with reference to FIGS. 2 and 3.

In some cases, mapper 710 may directly map reconfigured TBs 705 including dummy TBs 760 to resource map 715. In some cases, mapper 710 may map reconfigured TBs 705 including dummy TBs 760 around invalid subframes as described with reference to FIG. 6 or 7.

A receiving device that receives transmissions over resource map 715 may identify a transport block index associated with each resources 755 based on computing Equation 1 for each subframe. In some cases, the receiving device may determine that a dummy transport block was transmitted over a resource based on computing a modified version of Equation 1 where Equation 1 may be rewritten with $N_{sched}$ being replaced by $N_{sched}+\Delta gap$, where $I_{TB}(i) \in \{N_{sched}, \ldots, N_{sched}+\Delta_{gap}+1\}$.

Figure 8:
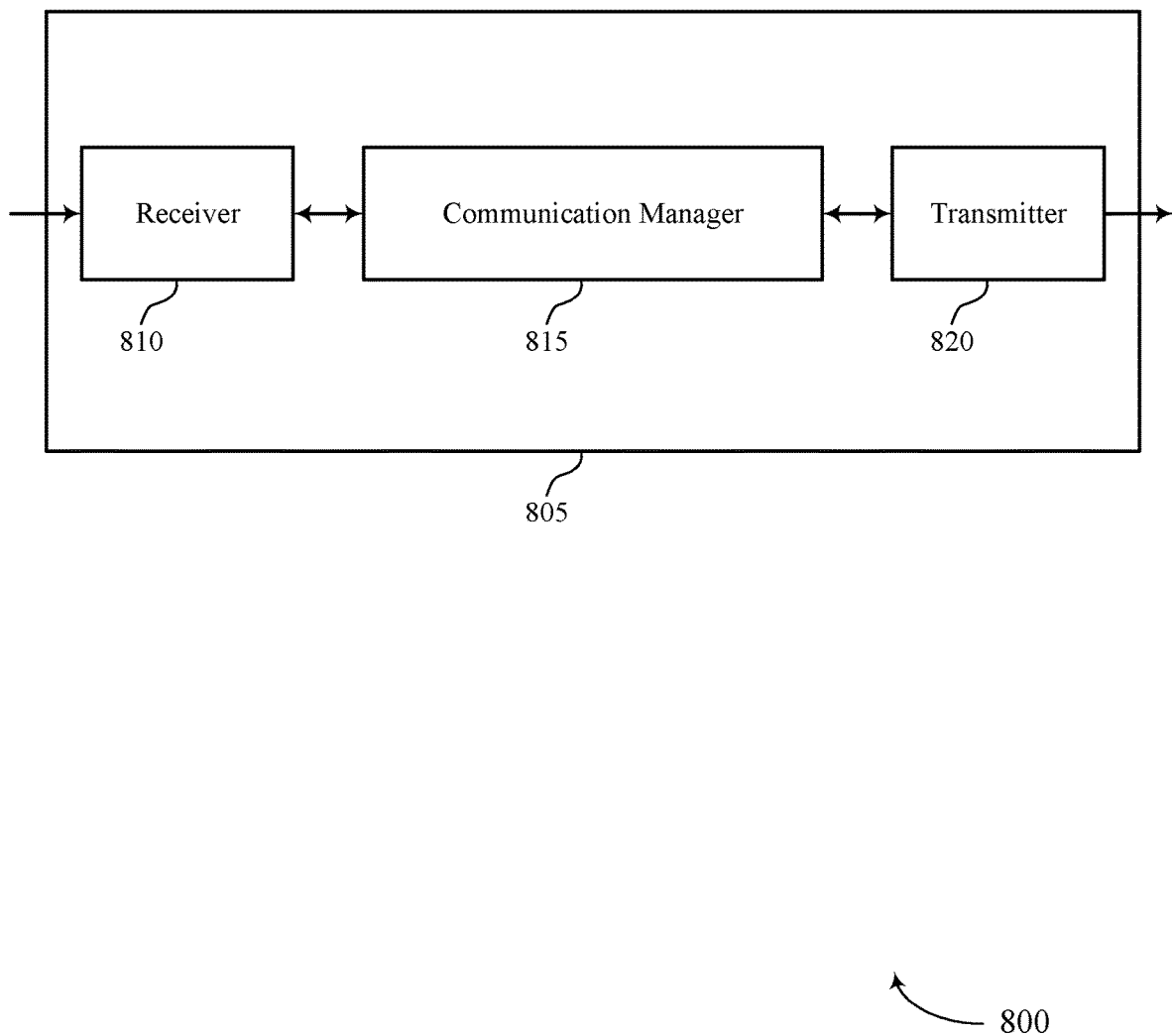
FIGS. 8 and 9 show block diagrams of devices that support communicating repetitions of multiple transport blocks scheduled by a single DCI message as disclosed herein.

FIG. 8 shows a block diagram 800 of a device 805 that supports communicating repetitions of multiple transport blocks scheduled by a single DCI message as disclosed herein. The device 805 may be an example of aspects of a base station 105 or UE 115 as described herein. The device 805 may include a receiver 810, a communication manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to communicating repetitions of multiple transport blocks scheduled by single downlink control information, etc.). Information may be passed on to other components of the device 805. The receiver 810 may be an example of aspects of the transceiver 1115 described with reference to FIG. 11. The receiver 810 may utilize a single antenna or a set of antennas.

The communication manager 815 may receive a single DCI message scheduling the UE to receive a set of transport blocks, identify that the set of transport blocks and repetitions of the set of transport blocks are scheduled to be interleaved and to be received over a set of resources in accordance with a frequency hopping pattern that includes a set of subbands and spans a first periodic interval, identify a mapping pattern for receipt of the set of transport blocks and the repetitions based on the set of resources being partitioned into one or more subunits based on the first periodic interval and a number of the set of transport blocks, where each of the one or more subunits includes resources spread over each subband of the frequency hopping pattern and at least one instance of each of the set of transport blocks, and receive the set of transport blocks and the repetitions over the set of resources based on the mapping pattern. The communication manager 815 may be an example of aspects of the communication manager 1110 described herein.

The communication manager 815, or its sub-components, may be implemented in hardware, software (e.g., executed by a processor), or any combination thereof. If implemented in code executed by a processor, the functions of the communication manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 815, or its sub-components, may be physically located at various positions, including being distributed such that portions of functions are implemented at different physical locations by one or more physical components. In some examples, the communication manager 815, or its sub-components, may be a separate and distinct component as disclosed herein. In some examples, the communication manager 815, or its sub-components, may be combined with one or more other hardware components, including but not limited to an input/output (I/O) component, a transceiver, a network server, another computing device, one or more other components described in the present disclosure, or a combination thereof as disclosed herein.

The transmitter 820 may transmit signals generated by other components of the device 805. In some examples, the transmitter 820 may be collocated with a receiver 810 in a transceiver module. For example, the transmitter 820 may be an example of aspects of the transceiver 1115 described with reference to FIG. 11. The transmitter 820 may utilize a single antenna or a set of antennas.

Figure 9:
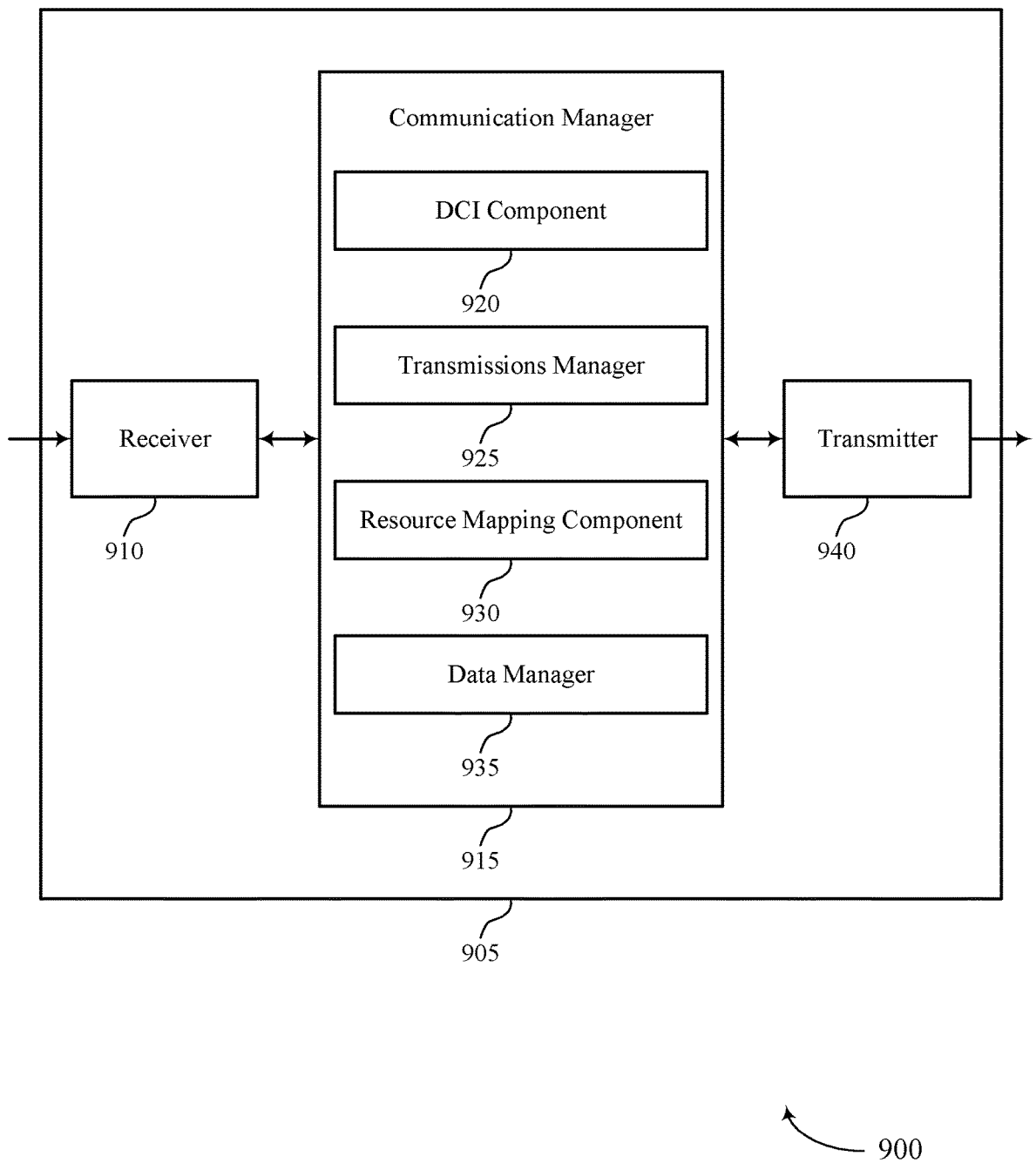

FIG. 9 shows a block diagram 900 of a device 905 that supports communicating repetitions of multiple transport blocks scheduled by a single DCI message as disclosed herein. The device 905 may be an example of aspects of a device 805, base station 105, or a UE 115 as described herein. The device 905 may include a receiver 910, a communication manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to communicating repetitions of multiple transport blocks scheduled by single downlink control information, etc.). Information may be passed on to other components of the device 905. The receiver 910 may be an example of aspects of the transceiver 1115 described with reference to FIG. 11. The receiver 910 may utilize a single antenna or a set of antennas.

The communication manager 915 may be an example of aspects of the communication manager 815 as described herein. The communication manager 915 may include a DCI component 920, a transmissions manager 925, a resource mapping component 930, and a data manager 935. The communication manager 915 may be an example of aspects of the communication manager 1110 described herein.

The DCI component 920 may receive a single DCI message scheduling the UE to receive a set of transport blocks.

The resource mapping component 930 may identify a mapping pattern for receipt of the set of transport blocks and the repetitions based on the set of resources being partitioned into one or more subunits based on the first periodic interval and a number of the set of transport blocks, where each of the one or more subunits includes resources spread over each subband of the frequency hopping pattern and at least one instance of each of the set of transport blocks.

The data manager 935 may receive the set of transport blocks and the repetitions over the set of resources based on the mapping pattern.

The transmissions manager 925 may identify that the set of transport blocks and repetitions of the set of transport blocks are scheduled to be interleaved and to be received over a set of resources in accordance with a frequency hopping pattern that includes a set of subbands and spans a first periodic interval.

The transmitter 940 may transmit signals generated by other components of the device 905. In some examples, the transmitter 940 may be collocated with a receiver 910 in a transceiver module. For example, the transmitter 940 may be an example of aspects of the transceiver 1115 described with reference to FIG. 11. The transmitter 940 may utilize a single antenna or a set of antennas.

Figure 10:
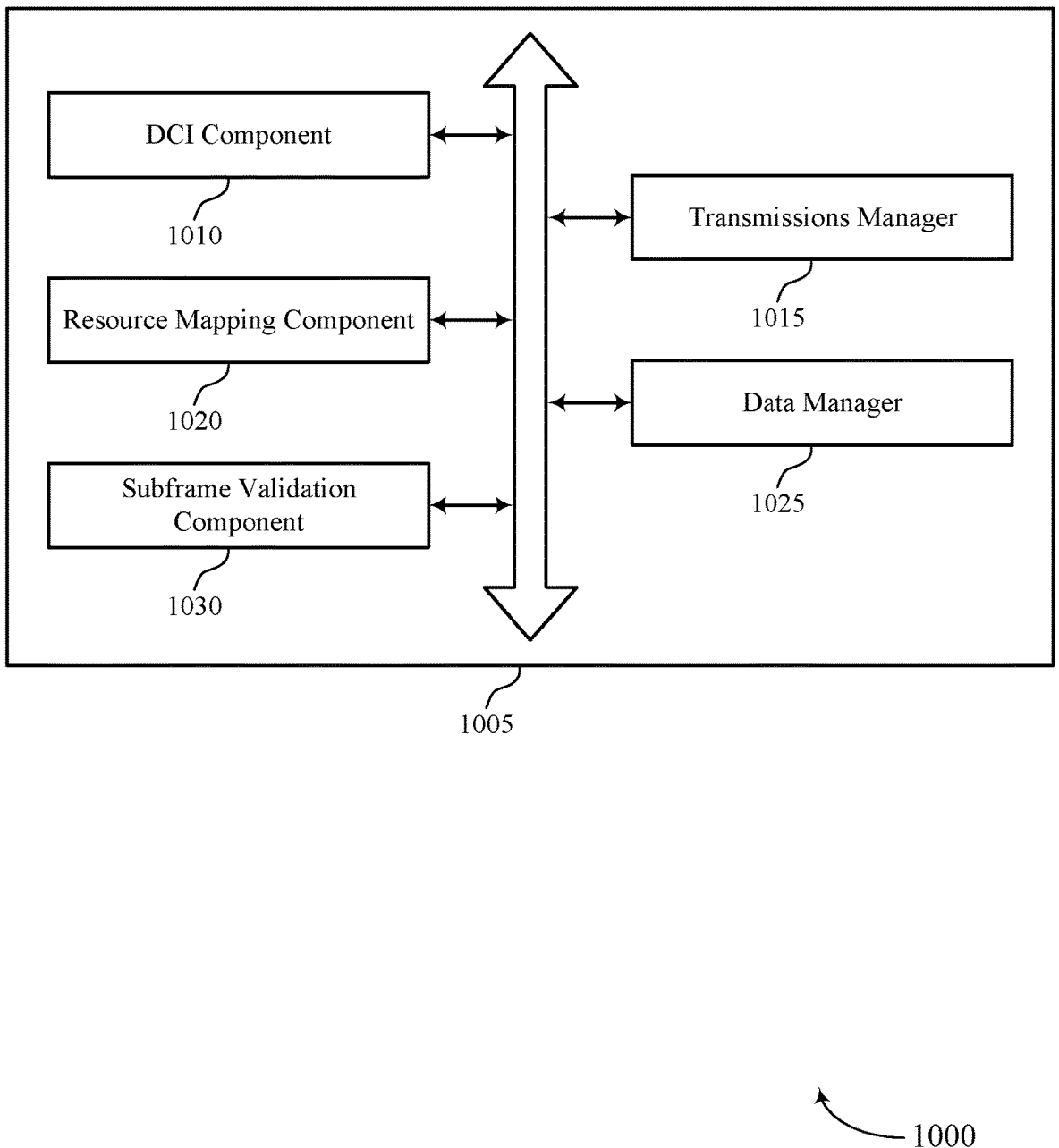
FIG. 10 shows a block diagram of a communication manager that supports communicating repetitions of multiple transport blocks scheduled by a single DCI message as disclosed herein.

FIG. 10 shows a block diagram 1000 of a communication manager 1005 that supports communicating repetitions of multiple transport blocks scheduled by a single DCI message as disclosed herein. The communication manager 1005 may be an example of aspects of a communication manager 815, a communication manager 915, or a communication manager 1110 described herein. The communication manager 1005 may include a DCI component 1010, a transmissions manager 1015, a resource mapping component 1020, a data manager 1025, and a subframe validation component 1030. Each of these modules may communicate, directly or indirectly, with one another (e.g., via one or more buses).

The DCI component 1010 may receive a single DCI message scheduling the UE to receive a set of transport blocks.

The transmissions manager 1015 may identify that the set of transport blocks and repetitions of the set of transport blocks are scheduled to be interleaved and to be received over a set of resources in accordance with a frequency hopping pattern that includes a set of subbands and spans a first periodic interval.

The resource mapping component 1020 may identify a mapping pattern for receipt of the set of transport blocks and the repetitions based on the set of resources being partitioned into one or more subunits based on the first periodic interval and a number of the set of transport blocks, where each of the one or more subunits includes resources spread over each subband of the frequency hopping pattern and at least one instance of each of the set of transport blocks. In some cases, the identifying includes identifying that the set of transport blocks, repetitions, and one or more blank transport blocks are interleaved, where each of the one or more subunits includes at least one instance of each of the one or more blank transport blocks.

In some examples, the resource mapping component 1020 may determine that a cyclic shift was applied to a subunit of the one or more subunits based on determining that a frequency diversity associated with a transmission of a transport block of the set of transport blocks without the application of the cyclic shift is below a threshold.

In some examples, the resource mapping component 1020 may determine, for a resource of the set of resources that occurs within the subunit of the one or more subunits, an index associated with the set of transport blocks based on determining that the cyclic shift was applied to the subunit.

In some examples, the resource mapping component 1020 may determine a second interval that is at least as long as the first periodic interval based on the interleaving granularity, the number of the set of transport blocks, and a length of the first periodic interval, where the one or more subunits span the second interval. In some examples, determining the length of the second interval includes calculating a least common multiple of a product of multiplying the number of the set of transport blocks by the interleaving granularity and a number of subframes included by the first periodic interval.

In some examples, the resource mapping component 1020 may determine, for a resource of the set of resources, an index associated with the set of transport blocks based on the interleaving granularity, an index of a subunit including the resource, and a value of a cyclic shift applied with the subunit. In some examples, determining the index of the subunit includes dividing the index of a subframe that includes the resource by a least common multiple of a product of multiplying the number of the set of transport blocks by the interleaving granularity and a number of subframes included by the first periodic interval. In some examples, the resource mapping component 1020 may round a quotient of the division down to a nearest integer.

In some examples, the resource mapping component 1020 may determine a greatest common factor of the number of the set of transport blocks and a first quotient of dividing a number of subframes included by the first periodic interval by the interleaving granularity is greater than one, where the first quotient is rounded up to a nearest integer.

In some examples, the resource mapping component 1020 may determine the value of the cyclic shift applied to the subunit is equal to a second quotient of dividing a hopping interval by the interleaving granularity, where the second quotient is rounded up to a nearest integer, based on determining that the greatest common factor is greater than one.

In some examples, the resource mapping component 1020 may determine a greatest common factor of the number of the set of transport blocks and a first quotient of dividing a number of subframes included by the first periodic interval by the interleaving granularity is equal to one, where the first quotient is rounded up to a nearest integer.

In some examples, the resource mapping component 1020 may determine the value of the cyclic shift applied to the subunit is equal to zero based on determining that the greatest common factor is equal to one.

In some examples, the resource mapping component 1020 may multiply the index of the subunit by the value of the cyclic shift.

In some examples, resource mapping component 1020 may add a product of the multiplying to a quotient of dividing an index of a subframe that includes the resource by the interleaving granularity, where the quotient is rounded down to a nearest integer.

In some examples, the resource mapping component 1020 may determine a remainder resulting from dividing a sum of the addition by the number of the set of transport blocks.

In some examples, the resource mapping component 1020 may determine that an initial resource of the set of resources is aligned with a subframe having a starting index of zero.

In some examples, the resource mapping component 1020 may determine that the subset of the set of transport blocks and the subset of the repetitions are buffered based on the identifying.

In some examples, the resource mapping component 1020 may determine, for the set of resources, an index associated with the set of transport blocks based on the consecutive set of subframe indices.

In some examples, the resource mapping component 1020 may determine a length of the first periodic interval is based on multiplying the number of the set of subbands by a number of subframes allocated to each of the set of subbands by the frequency hopping pattern.

In some cases, the at least one instance of each of the set of transport blocks includes each of the set of transport blocks, a repetition of each of the set of transport blocks, or any combination thereof.

The data manager 1025 may receive the set of transport blocks and the repetitions over the set of resources based on the mapping pattern.

In some examples, the data manager 1025 may receive the subset of the set of transport blocks and the subset of the repetitions after receiving the remaining interleaved set of transport blocks and repetitions.

The subframe validation component 1030 may determine that a set of invalid subframes is interspersed within the set of resources, where the set of invalid subframes correspond to a second set of subframe indices.

In some examples, the subframe validation component 1030 may identify a subset of the set of transport blocks and a subset of the repetitions corresponding to respective subframe indices of the first set of subframe indices that overlap with subframe indices of the second set of subframe indices.

In some examples, the subframe validation component 1030 may determine that a set of invalid subframes is interspersed within the set of resources, where the set of resources are associated with valid subframes.

In some examples, the subframe validation component 1030 may identify a consecutive set of subframe indices associated with the set of resources.

In some cases, the set of invalid subframes includes uplink subframes that occur during downlink transmission to the UE, downlink subframes that are occur during uplink transmissions to a base station, blank subframes, scheduling subframes, broadcast subframes, or any combination thereof.

Figure 11:
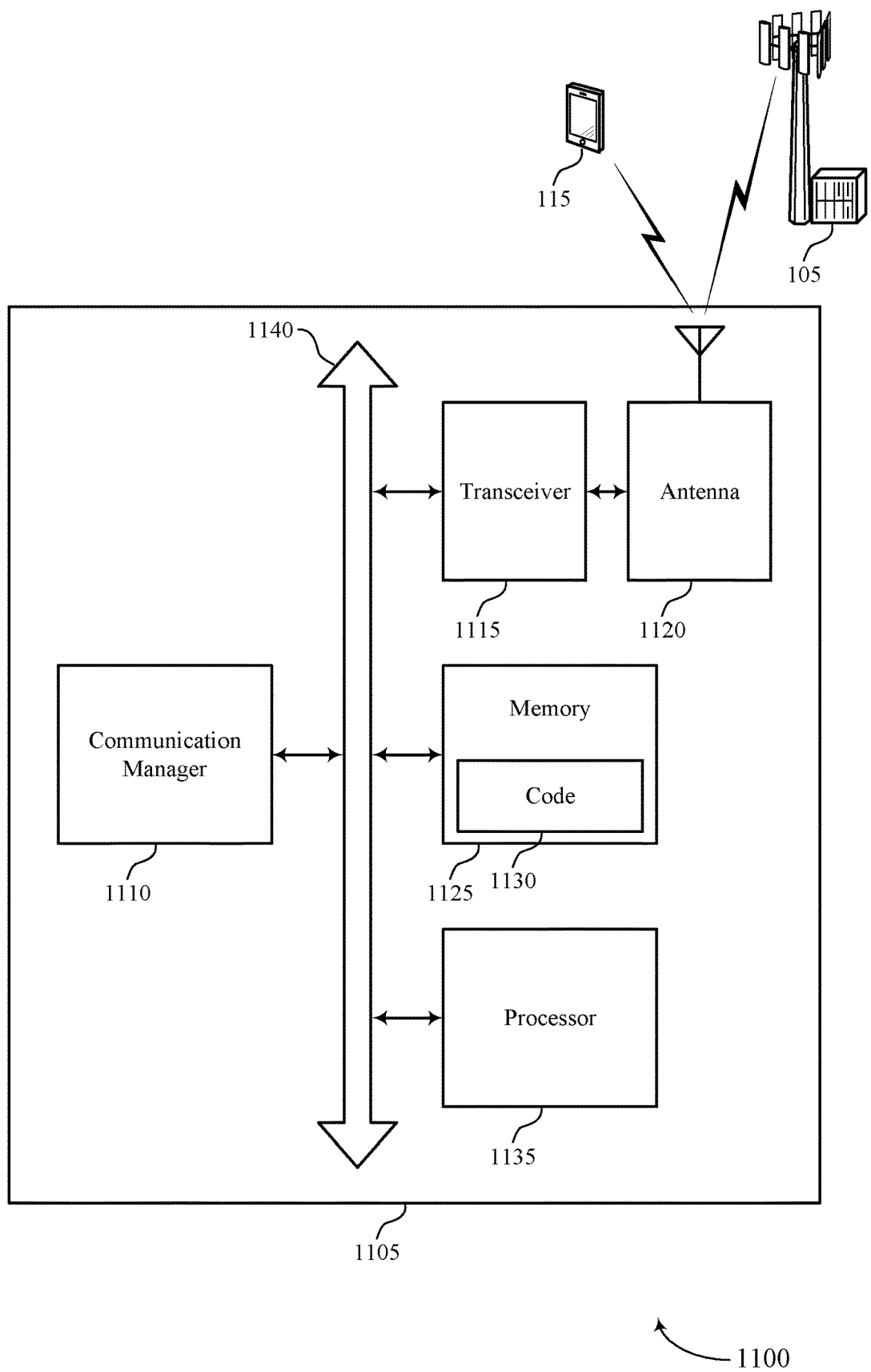
FIG. 11 shows a diagram of a system including a device that supports communicating repetitions of multiple transport blocks scheduled by a single DCI message as disclosed herein.

FIG. 11 shows a diagram of a system 1100 including a device 1105 that supports communicating repetitions of multiple transport blocks scheduled by a single DCI message as disclosed herein. The device 1105 may be an example of or include the components of device 805, device 905, a base station 105, or a UE 115 as described herein. The device 1105 may include components for bi-directional voice and data communications including components for transmitting and receiving communications, including a communication manager 1110, a transceiver 1115, an antenna 1120, memory 1125, and a processor 1135. These components may be coupled (e.g., operatively, communicatively, functionally, electronically, electrically, etc.) via one or more buses (e.g., bus 1140).

The communication manager 1110 may receive a single DCI message scheduling the UE to receive a set of transport blocks, identify that the set of transport blocks and repetitions of the set of transport blocks are scheduled to be interleaved and to be received over a set of resources in accordance with a frequency hopping pattern that includes a set of subbands and spans a first periodic interval, identify a mapping pattern for receipt of the set of transport blocks and the repetitions based on the set of resources being partitioned into one or more subunits based on the first periodic interval and a number of the set of transport blocks, where each of the one or more subunits includes resources spread over each subband of the frequency hopping pattern and at least one instance of each of the set of transport blocks, and receive the set of transport blocks and the repetitions over the set of resources based on the mapping pattern.

The transceiver 1115 may communicate bi-directionally, via one or more antennas, wired, or wireless links as described above. For example, the transceiver 1115 may represent a wireless transceiver and may communicate bi-directionally with another wireless transceiver. The transceiver 1115 may also include a modem to modulate the packets and provide the modulated packets to the antennas for transmission, and to demodulate packets received from the antennas.

In some cases, the wireless device may include a single antenna 1120. However, in some cases the device may have more than one antenna 1120, which may be capable of concurrently transmitting or receiving multiple wireless transmissions.

The memory 1125 may include random-access memory (RAM) and read-only memory (ROM). The memory 1125 may store computer-readable, computer-executable code 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

The code 1130 may include instructions to implement aspects of the present disclosure, including instructions to support wireless communications. The code 1130 may be stored in a non-transitory computer-readable medium such as system memory or other type of memory. In some cases, the code 1130 may not be directly executable by the processor 1135 but may cause a computer (e.g., when compiled and executed) to perform functions described herein.

The processor 1135 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1135 may be configured to operate a memory array using a memory controller. In other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting communicating repetitions of multiple transport blocks scheduled by single downlink control information).

Figure 12:
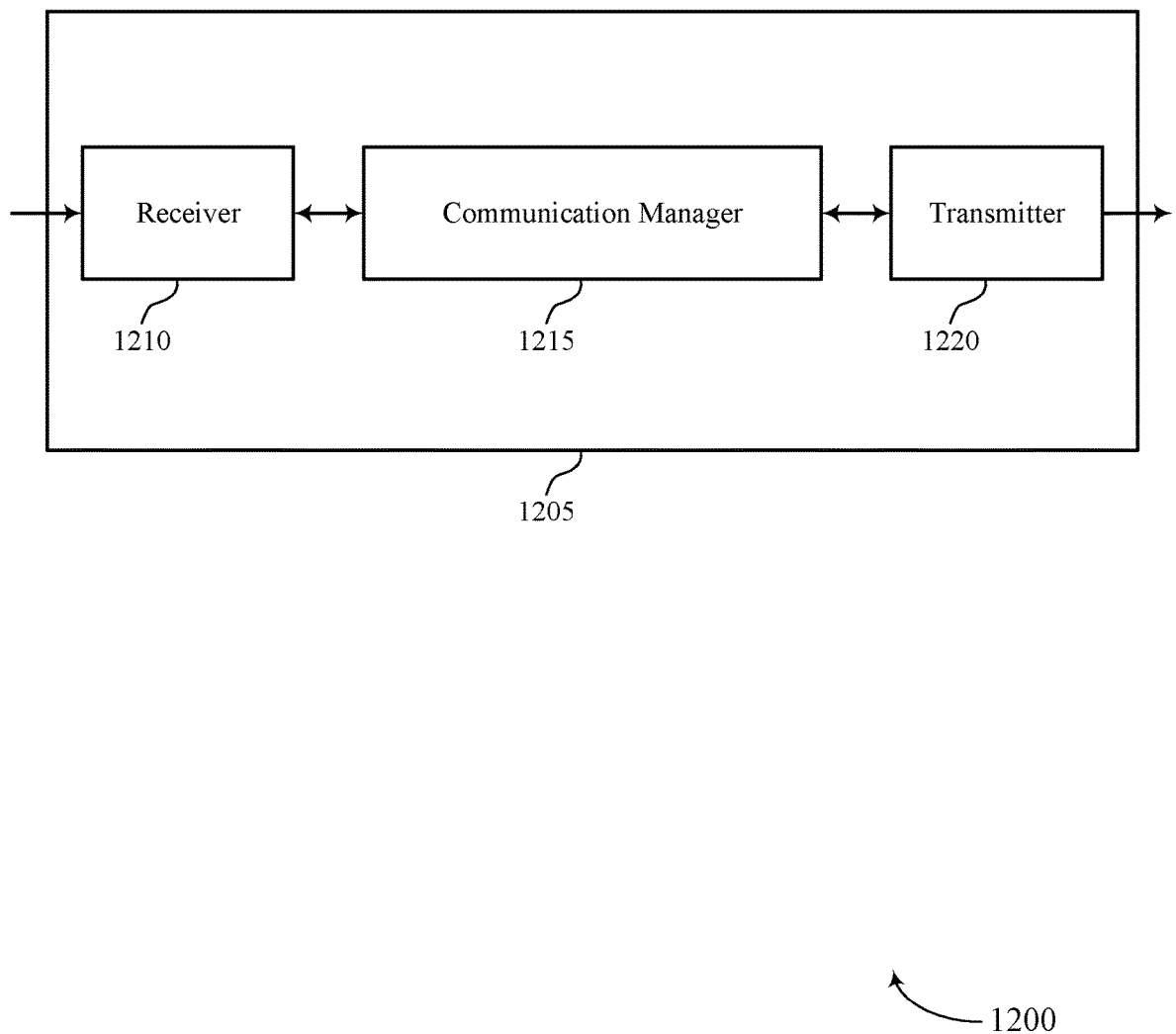
FIGS. 12 and 13 show block diagrams of devices that support communicating repetitions of multiple transport blocks scheduled by a single DCI message as disclosed herein.

FIG. 12 shows a block diagram 1200 of a device 1205 that supports communicating repetitions of multiple transport blocks scheduled by a single DCI message as disclosed herein. The device 1205 may be an example of aspects of a base station 105 or UE 115 as described herein. The device 1205 may include a receiver 1210, a communication manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to communicating repetitions of multiple transport blocks scheduled by single downlink control information, etc.). Information may be passed on to other components of the device 1205. The receiver 1210 may be an example of aspects of the transceiver 1520 described with reference to FIG. 15. The receiver 1210 may utilize a single antenna or a set of antennas.

The communication manager 1215 may transmit a single DCI message scheduling a UE to receive a set of transport blocks, interleave the set of transport blocks with repetitions of the set of transport blocks that include at least one repetition of each of the set of transport blocks, where the set of transport blocks and the repetitions are to be transmitted over a set of resources in accordance with a frequency hopping pattern that includes a set of subbands and spans a first periodic interval, partition, based on the interleaving and a mapping pattern, the set of transport blocks and the repetitions into one or more subunits based on the first periodic interval and a number of the set of transport blocks, where each of the one or more subunits includes at least one instance of each of the set of transport blocks and spans at least the first periodic interval, map the set of transport blocks and the repetitions to the set of resources based on the partitioning, and transmit the set of transport blocks and the repetitions over the set of resources based on the mapping. The communication manager 1215 may be an example of aspects of the communication manager 1510 described herein.

The communication manager 1215, or its sub-components, may be implemented in hardware, software (e.g., executed by a processor), or any combination thereof. If implemented in code executed by a processor, the functions of the communication manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1215, or its sub-components, may be physically located at various positions, including being distributed such that portions of functions are implemented at different physical locations by one or more physical components. In some examples, the communication manager 1215, or its sub-components, may be a separate and distinct component as disclosed herein. In some examples, the communication manager 1215, or its sub-components, may be combined with one or more other hardware components, including but not limited to an input/output (I/O) component, a transceiver, a network server, another computing device, one or more other components described in the present disclosure, or a combination thereof as disclosed herein.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
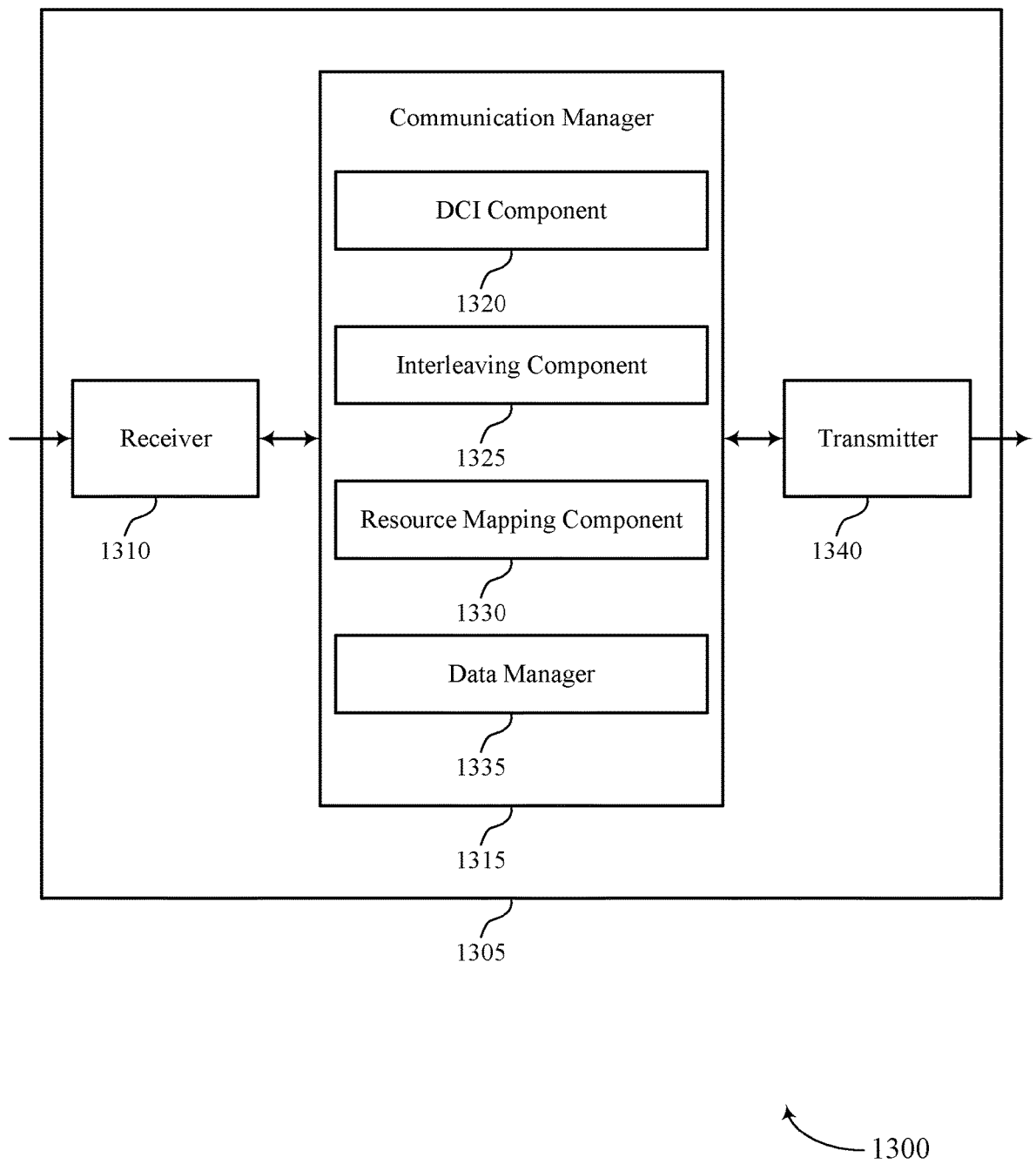

FIG. 13 shows a block diagram 1300 of a device 1305 that supports communicating repetitions of multiple transport blocks scheduled by a single DCI message as disclosed herein. The device 1305 may be an example of aspects of a device 1205, a base station 105, or UE 115 as described herein. The device 1305 may include a receiver 1310, a communication manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to communicating repetitions of multiple transport blocks scheduled by single downlink control information, etc.). Information may be passed on to other components of the device 1305. The receiver 1310 may be an example of aspects of the transceiver 1520 described with reference to FIG. 15. The receiver 1310 may utilize a single antenna or a set of antennas.

The communication manager 1315 may be an example of aspects of the communication manager 1215 as described herein. The communication manager 1315 may include a DCI component 1320, an interleaving component 1325, a resource mapping component 1330, and a data manager 1335. The communication manager 1315 may be an example of aspects of the communication manager 1510 described herein.

The DCI component 1320 may transmit a single DCI message scheduling a UE to receive a set of transport blocks.

The interleaving component 1325 may interleave the set of transport blocks with repetitions of the set of transport blocks that include at least one repetition of each of the set of transport blocks, where the set of transport blocks and the repetitions are to be transmitted over a set of resources in accordance with a frequency hopping pattern that includes a set of subbands and spans a first periodic interval and partition, based on the interleaving and a mapping pattern, the set of transport blocks and the repetitions into one or more subunits based on the first periodic interval and a number of the set of transport blocks, where each of the one or more subunits includes at least one instance of each of the set of transport blocks and spans at least the first periodic interval.

The data manager 1335 may transmit the set of transport blocks and the repetitions over the set of resources based on the mapping.

The resource mapping component 1330 may map the set of transport blocks and the repetitions to the set of resources based on the partitioning.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
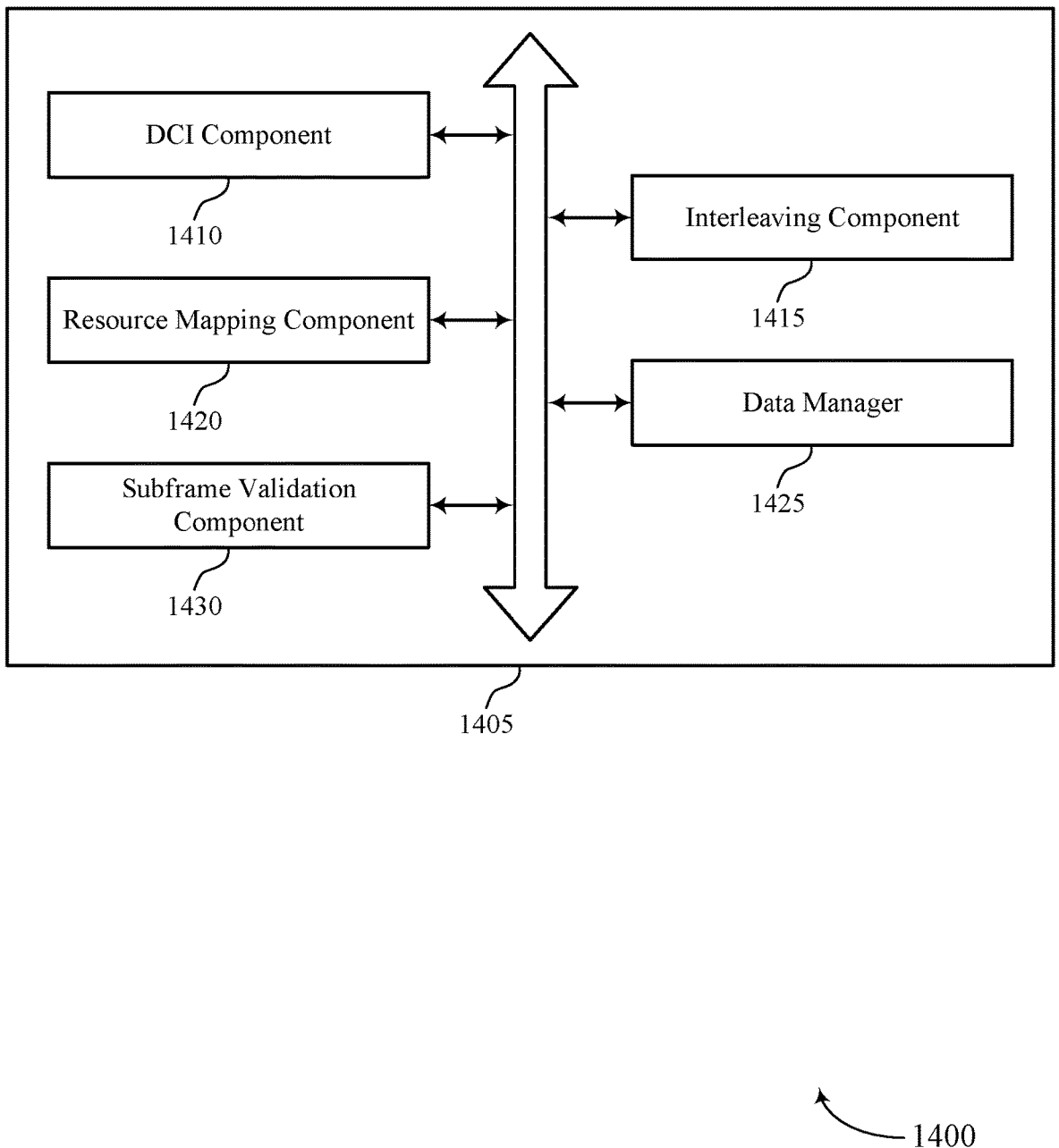
FIG. 14 shows a block diagram of a communication manager that supports communicating repetitions of multiple transport blocks scheduled by a single DCI message as disclosed herein.

FIG. 14 shows a block diagram 1400 of a communication manager 1405 that supports communicating repetitions of multiple transport blocks scheduled by a single DCI message as disclosed herein. The communication manager 1405 may be an example of aspects of a communication manager 1215, a communication manager 1315, or a communication manager 1510 described herein. The communication manager 1405 may include a DCI component 1410, an interleaving component 1415, a resource mapping component 1420, a data manager 1425, and a subframe validation component 1430. Each of these modules may communicate, directly or indirectly, with one another (e.g., via one or more buses).

The DCI component 1410 may transmit a single DCI message scheduling a UE to receive a set of transport blocks.

The interleaving component 1415 may interleave the set of transport blocks with repetitions of the set of transport blocks that include at least one repetition of each of the set of transport blocks, where the set of transport blocks and the repetitions are to be transmitted over a set of resources in accordance with a frequency hopping pattern that includes a set of subbands and spans a first periodic interval. In some cases, the interleaving includes interleaving the interleaved set of transport blocks and repetitions with one or more blank transport blocks according to the mapping pattern.

In some examples, the interleaving component 1415 may partition, based on the interleaving and a mapping pattern, the set of transport blocks and the repetitions into one or more subunits based on the first periodic interval and a number of the set of transport blocks, where each of the one or more subunits includes at least one instance of each of the set of transport blocks and spans at least the first periodic interval.

In some examples, the interleaving component 1415 may align an initial resource of the set of resources with a subframe having a starting index of zero.

In some examples, determining the length of the second interval includes calculating a least common multiple of a product of multiplying the number of the set of transport blocks by the interleaving granularity and a number of subframes included by the first periodic interval.

In some examples, the interleaving component 1415 may determine whether to apply, before the mapping, a cyclic shift to a subunit of the one or more subunits based on a frequency diversity associated with each transport block of the set of transport blocks based on the mapping pattern.

In some examples, the interleaving component 1415 may apply, before the mapping, the cyclic shift to the subunit based on determining that that the frequency diversity associated with a transmission of a transport block of the set of transport blocks without the application of the cyclic shift is below a threshold.

In some examples, the interleaving component 1415 may refrain from applying the cyclic shift to the subunit based on determining that a greatest common factor of the number of the set of transport blocks and a quotient of dividing a number of subframes included by the first periodic interval by the interleaving granularity is equal to one, where the quotient is round up to the nearest integer.

In some examples, the interleaving component 1415 may apply the cyclic shift to the subunit based on determining that a greatest common factor of the number of the set of transport blocks and a quotient of dividing a number of subframes included by the first periodic interval by the interleaving granularity is greater than one, where the quotient is round up to the nearest integer.

In some examples, the interleaving component 1415 may buffer the subset of the set of transport blocks and the subset of the repetitions based on the identifying.

The resource mapping component 1420 may map the set of transport blocks and the repetitions to the set of resources based on the partitioning.

In some examples, the resource mapping component 1420 may determine a second interval that is at least as long as the first periodic interval based on the interleaving granularity, the number of the set of transport blocks, and a length of the first periodic interval, where the one or more subunits span the second interval.

In some examples, the resource mapping component 1420 may allocate the set of resources to the UE, where the set of resources span a second interval that is longer than the first periodic interval.

The data manager 1425 may transmit the set of transport blocks and the repetitions over the set of resources based on the mapping.

In some examples, the data manager 1425 may transmit the subset of the set of transport blocks and the subset of the repetitions after transmitting the remaining interleaved set of transport blocks and repetitions.

The subframe validation component 1430 may determine that a set of invalid subframes is interspersed within the set of resources, where the set of invalid subframes correspond to a second set of subframe indices, and where the set of resources are associated with valid subframes.

In some examples, the subframe validation component 1430 may identify a subset of the set of transport blocks and a subset of the repetitions corresponding to respective subframe indices of the first set of subframe indices that overlap with subframe indices of the second set of subframe indices.

In some examples, the subframe validation component 1430 may determine that a set of invalid subframes is interspersed within the set of resources, where the set of invalid subframes correspond to a second set of subframe indices, where the set of resources are associated with valid subframes, and where the set of transport blocks and the repetitions are mapped to the set of resources based on the determining.

In some cases, the set of invalid subframes includes uplink subframes that occur during downlink transmission to the UE, downlink subframes that are occur during uplink transmissions to a base station, blank subframes, scheduling subframes, broadcast subframes, or any combination thereof.

Figure 15:
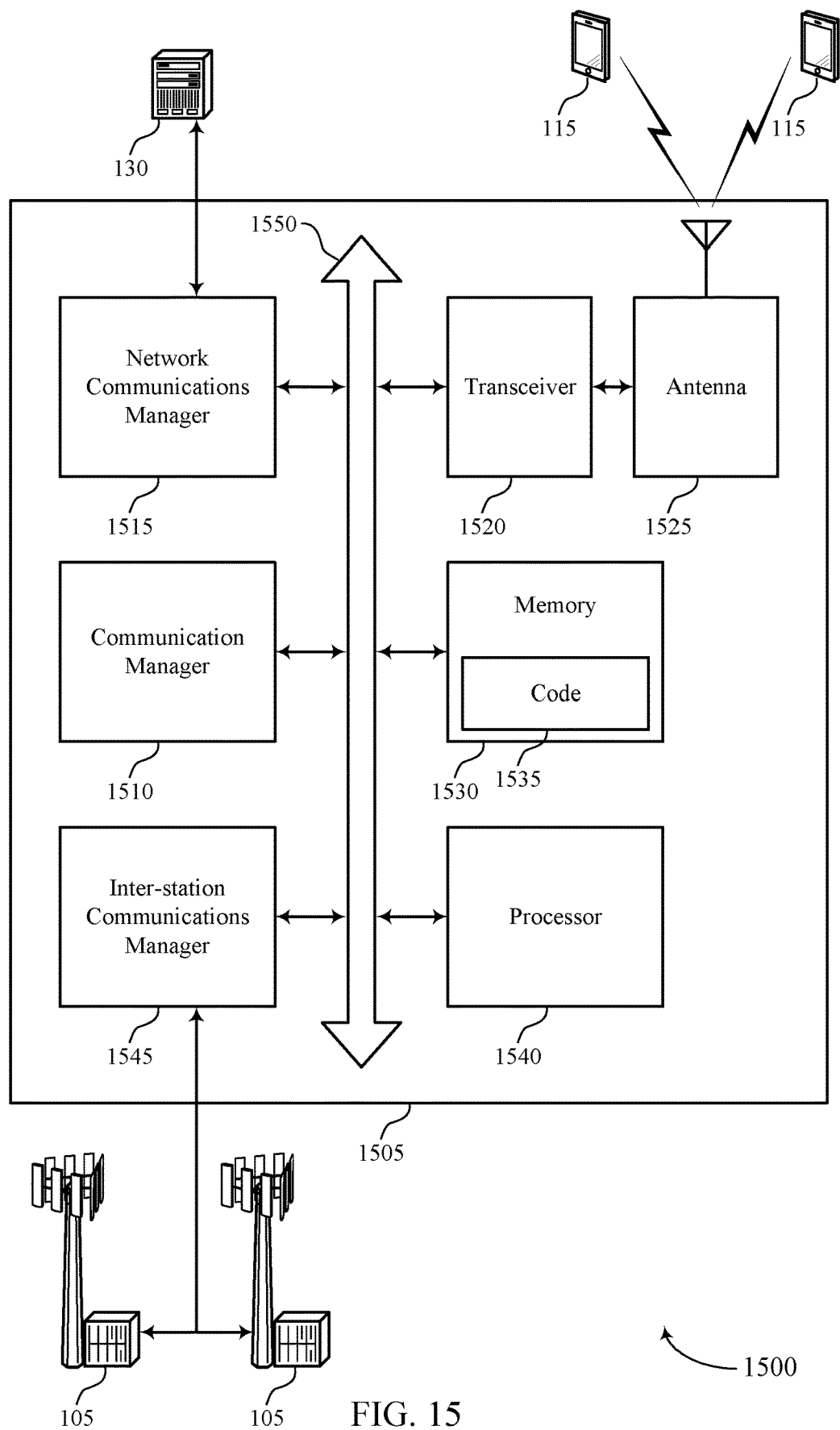
FIG. 15 shows a diagram of a system including a device that supports communicating repetitions of multiple transport blocks scheduled by a single DCI message as disclosed herein.

FIG. 15 shows a diagram of a system 1500 including a device 1505 that supports communicating repetitions of multiple transport blocks scheduled by a single DCI message as disclosed herein. The device 1505 may be an example of or include the components of device 1205, device 1305, a base station 105, or a UE 115 as described herein. The device 1505 may include components for bi-directional voice and data communications including components for transmitting and receiving communications, including a communication manager 1510, a network communication manager 1515, a transceiver 1520, an antenna 1525, memory 1530, a processor 1540, and an inter-station communication manager 1545. These components may be coupled (e.g., operatively, communicatively, functionally, electronically, electrically, etc.) via one or more buses (e.g., bus 1550).

The communication manager 1510 may transmit a single DCI message scheduling a UE to receive a set of transport blocks, interleave the set of transport blocks with repetitions of the set of transport blocks that include at least one repetition of each of the set of transport blocks, where the set of transport blocks and the repetitions are to be transmitted over a set of resources in accordance with a frequency hopping pattern that includes a set of subbands and spans a first periodic interval, partition, based on the interleaving and a mapping pattern, the set of transport blocks and the repetitions into one or more subunits based on the first periodic interval and a number of the set of transport blocks, where each of the one or more subunits includes at least one instance of each of the set of transport blocks and spans at least the first periodic interval, map the set of transport blocks and the repetitions to the set of resources based on the partitioning, and transmit the set of transport blocks and the repetitions over the set of resources based on the mapping.

The network communication manager 1515 may manage communications with the core network (e.g., via one or more wired backhaul links). For example, the network communication manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM and ROM. The memory 1530 may store computer-readable, computer-executable code 1535 including instructions that, when executed, cause the processor to perform various functions described herein. In some cases, the memory 1530 may contain, among other things, a BIOS which may control basic hardware or software operation such as the interaction with peripheral components or devices.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting communicating repetitions of multiple transport blocks scheduled by single downlink control information).

The inter-station communication manager 1545 may manage communications with other base station 105, and may include a controller or scheduler for controlling communications with UEs 115 in cooperation with other base stations 105. For example, the inter-station communication manager 1545 may coordinate scheduling for transmissions to UEs 115 for various interference mitigation techniques such as beamforming or joint transmission. In some examples, the inter-station communication manager 1545 may provide an X2 interface within an LTE/LTE-A wireless communication network technology to provide communication between base stations 105.

Figure 16:
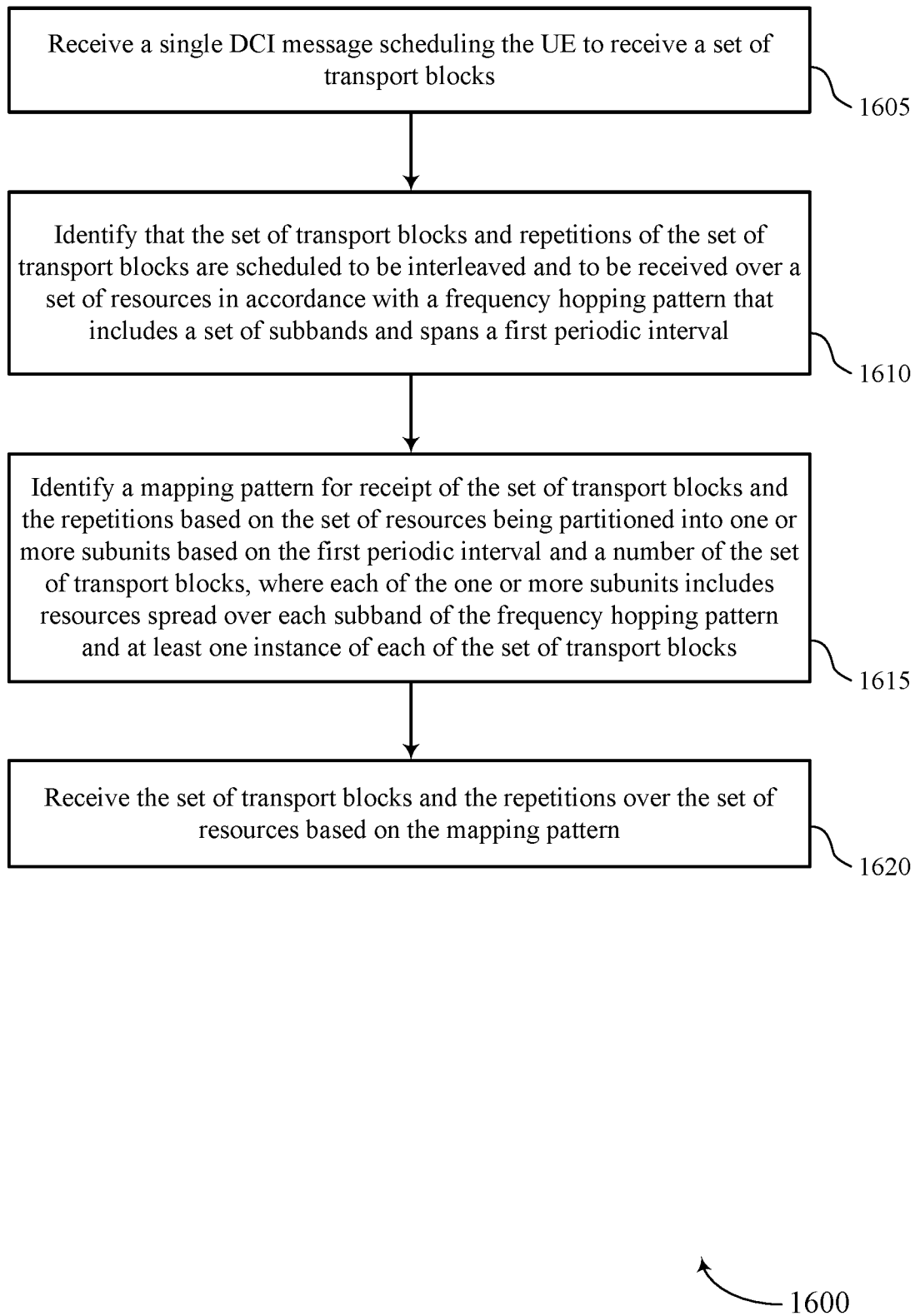
FIGS. 16 through 19 show flowcharts illustrating methods that support communicating repetitions of multiple transport blocks scheduled by a single DCI message as disclosed herein.

FIG. 16 shows a flowchart illustrating a method 1600 that supports communicating repetitions of multiple transport blocks scheduled by a single DCI message as disclosed herein. The operations of method 1600 may be implemented by a UE 115 or its components as described herein. For example, the operations of method 1600 may be performed by a communication manager as described with reference to FIGS. 8 through 11. In some examples, a UE may execute a set of instructions to control the functional elements of the UE to perform the described functions. Additionally, or alternatively, a UE may perform aspects of the described functions using special-purpose hardware.

At 1605, the UE may receive a single DCI message scheduling the UE to receive a set of transport blocks. The operations of 1605 may be performed according to the methods described herein. In some examples, aspects of the operations of 1605 may be performed by a DCI component as described with reference to FIGS. 8 through 11.

At 1610, the UE may identify that the set of transport blocks and repetitions of the set of transport blocks are scheduled to be interleaved and to be received over a set of resources in accordance with a frequency hopping pattern that includes a set of subbands and spans a first periodic interval. The operations of 1610 may be performed according to the methods described herein. In some examples, aspects of the operations of 1610 may be performed by a transmissions manager as described with reference to FIGS. 8 through 11.

At 1615, the UE may identify a mapping pattern for receipt of the set of transport blocks and the repetitions based on the set of resources being partitioned into one or more subunits based on the first periodic interval and a number of the set of transport blocks, where each of the one or more subunits includes resources spread over each subband of the frequency hopping pattern and at least one instance of each of the set of transport blocks. The operations of 1615 may be performed according to the methods described herein. In some examples, aspects of the operations of 1615 may be performed by a resource mapping component as described with reference to FIGS. 8 through 11.

At 1620, the UE may receive the set of transport blocks and the repetitions over the set of resources based on the mapping pattern. The operations of 1620 may be performed according to the methods described herein. In some examples, aspects of the operations of 1620 may be performed by a data manager as described with reference to FIGS. 8 through 11.

Figure 17:
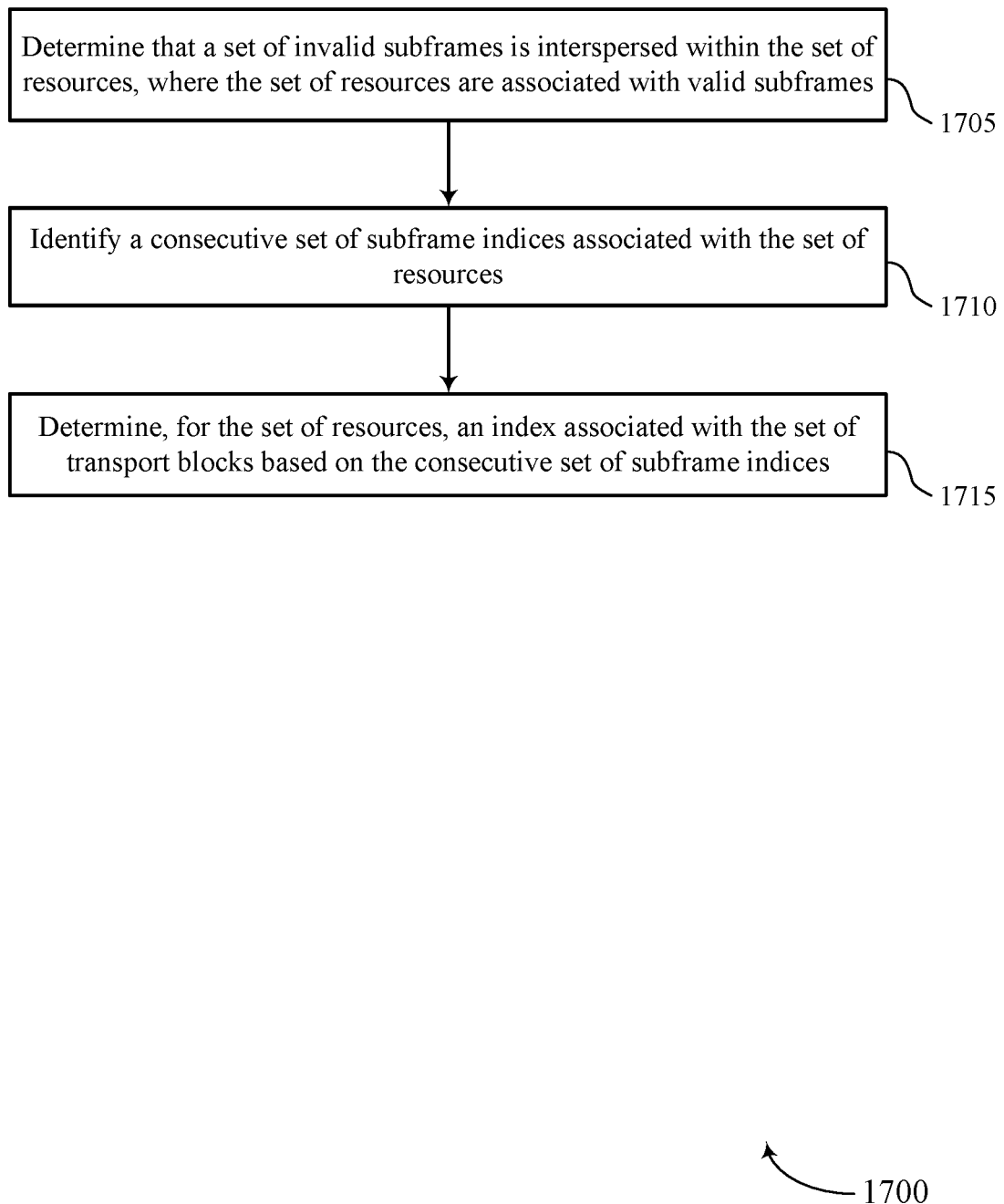

FIG. 17 shows a flowchart illustrating a method 1700 that supports communicating repetitions of multiple transport blocks scheduled by a single DCI message as disclosed herein. The operations of method 1700 may be implemented by a UE 115 or its components as described herein. For example, the operations of method 1700 may be performed by a communication manager as described with reference to FIGS. 8 through 11. In some examples, a UE may execute a set of instructions to control the functional elements of the UE to perform the described functions. Additionally, or alternatively, a UE may perform aspects of the described functions using special-purpose hardware.

At 1705, the UE may determine that a set of invalid subframes is interspersed within the set of resources, where the set of resources are associated with valid subframes. The operations of 1705 may be performed according to the methods described herein. In some examples, aspects of the operations of 1705 may be performed by a subframe validation component as described with reference to FIGS. 8 through 11.

At 1710, the UE may identify a consecutive set of subframe indices associated with the set of resources. The operations of 1710 may be performed according to the methods described herein. In some examples, aspects of the operations of 1710 may be performed by a subframe validation component as described with reference to FIGS. 8 through 11.

At 1715, the UE may determine, for the set of resources, an index associated with the set of transport blocks based on the consecutive set of subframe indices. The operations of 1715 may be performed according to the methods described herein. In some examples, aspects of the operations of 1715 may be performed by a resource mapping component as described with reference to FIGS. 8 through 11.

Figure 18:
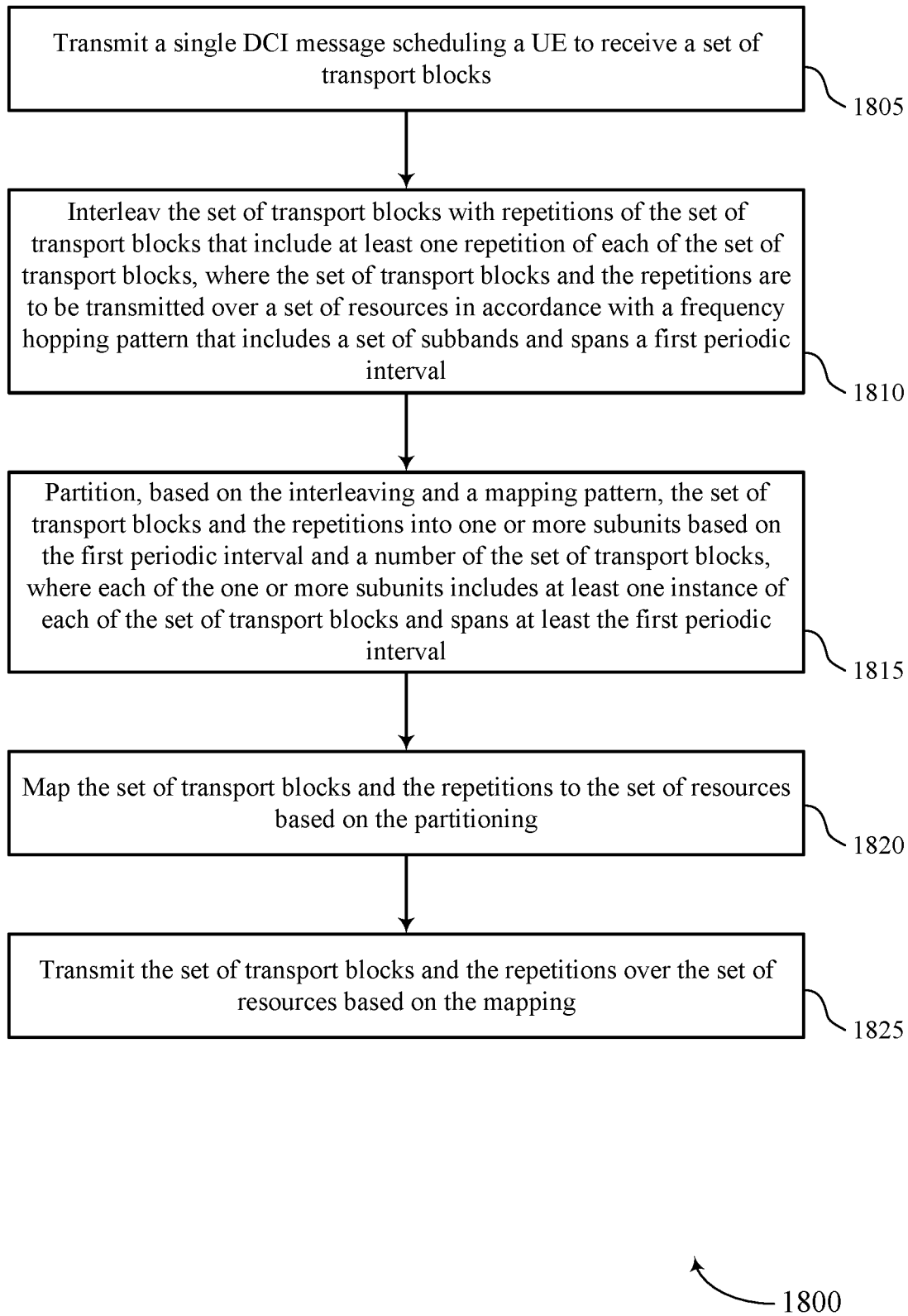

FIG. 18 shows a flowchart illustrating a method 1800 that supports communicating repetitions of multiple transport blocks scheduled by a single DCI message as disclosed herein. The operations of method 1800 may be implemented by a base station 105 or its components as described herein. For example, the operations of method 1800 may be performed by a communication manager as described with reference to FIGS. 12 through 15. In some examples, a base station may execute a set of instructions to control the functional elements of the base station to perform the described functions. Additionally, or alternatively, a base station may perform aspects of the described functions using special-purpose hardware.

At 1805, the base station may transmit a single DCI message scheduling a UE to receive a set of transport blocks. The operations of 1805 may be performed according to the methods described herein. In some examples, aspects of the operations of 1805 may be performed by a DCI component as described with reference to FIGS. 12 through 15.

At 1810, the base station may interleave the set of transport blocks with repetitions of the set of transport blocks that include at least one repetition of each of the set of transport blocks, where the set of transport blocks and the repetitions are to be transmitted over a set of resources in accordance with a frequency hopping pattern that includes a set of subbands and spans a first periodic interval. The operations of 1810 may be performed according to the methods described herein. In some examples, aspects of the operations of 1810 may be performed by an interleaving component as described with reference to FIGS. 12 through 15.

At 1815, the base station may partition, based on the interleaving and a mapping pattern, the set of transport blocks and the repetitions into one or more subunits based on the first periodic interval and a number of the set of transport blocks, where each of the one or more subunits includes at least one instance of each of the set of transport blocks and spans at least the first periodic interval. The operations of 1815 may be performed according to the methods described herein. In some examples, aspects of the operations of 1815 may be performed by an interleaving component as described with reference to FIGS. 12 through 15.

At 1820, the base station may map the set of transport blocks and the repetitions to the set of resources based on the partitioning. The operations of 1820 may be performed according to the methods described herein. In some examples, aspects of the operations of 1820 may be performed by a resource mapping component as described with reference to FIGS. 12 through 15.

At 1825, the base station may transmit the set of transport blocks and the repetitions over the set of resources based on the mapping. The operations of 1825 may be performed according to the methods described herein. In some examples, aspects of the operations of 1825 may be performed by a data manager as described with reference to FIGS. 12 through 15.

Figure 19:
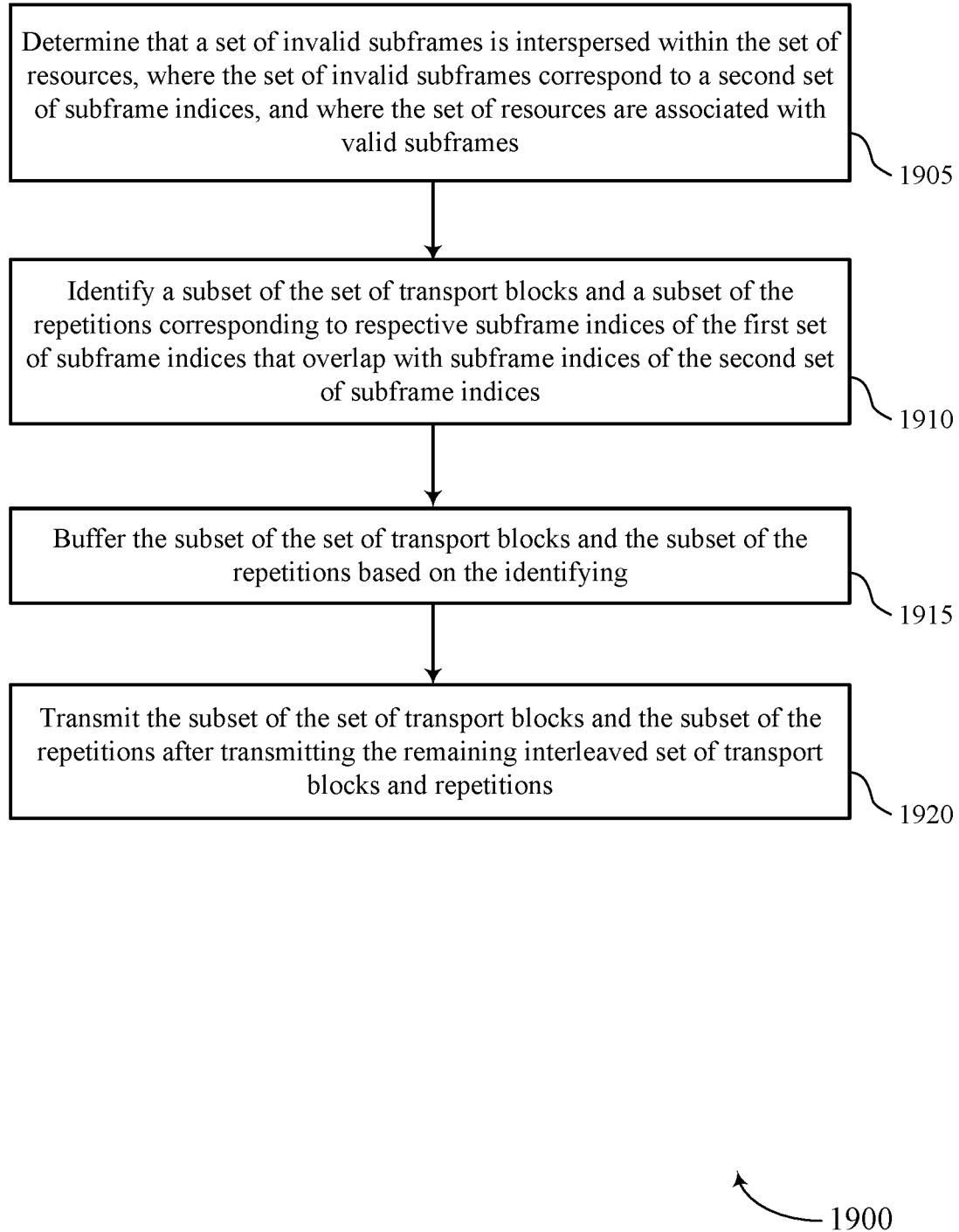

FIG. 19 shows a flowchart illustrating a method 1900 that supports communicating repetitions of multiple transport blocks scheduled by a single DCI message as disclosed herein. The operations of method 1900 may be implemented by a base station 105 or its components as described herein. For example, the operations of method 1900 may be performed by a communication manager as described with reference to FIGS. 12 through 15. In some examples, a base station may execute a set of instructions to control the functional elements of the base station to perform the described functions. Additionally, or alternatively, a base station may perform aspects of the described functions using special-purpose hardware.

At 1905, the base station may determine that a set of invalid subframes is interspersed within the set of resources, where the set of invalid subframes correspond to a second set of subframe indices, and where the set of resources are associated with valid subframes. The operations of 1905 may be performed according to the methods described herein. In some examples, aspects of the operations of 1905 may be performed by a subframe validation component as described with reference to FIGS. 12 through 15.

At 1910, the base station may identify a subset of the set of transport blocks and a subset of the repetitions corresponding to respective subframe indices of the first set of subframe indices that overlap with subframe indices of the second set of subframe indices. The operations of 1910 may be performed according to the methods described herein. In some examples, aspects of the operations of 1910 may be performed by a subframe validation component as described with reference to FIGS. 12 through 15.

At 1915, the base station may buffer the subset of the set of transport blocks and the subset of the repetitions based on the identifying. The operations of 1915 may be performed according to the methods described herein. In some examples, aspects of the operations of 1915 may be performed by an interleaving component as described with reference to FIGS. 12 through 15.

At 1920, the base station may transmit the subset of the set of transport blocks and the subset of the repetitions after transmitting the remaining interleaved set of transport blocks and repetitions. The operations of 1920 may be performed according to the methods described herein. In some examples, aspects of the operations of 1920 may be performed by a data manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a single downlink control information (DCI) message scheduling the UE to receive a plurality of transport blocks and repetitions of the plurality of transport blocks in accordance with an interleaving granularity over a plurality of resources that are distributed across a plurality of subbands in accordance with a frequency hopping pattern;
   determining, based at least in part on the interleaving granularity and the frequency hopping pattern, a mapping of an interleaved version of the plurality of transport blocks and the repetitions of the plurality of transport blocks to the plurality of resources based at least in part on the interleaving granularity, a plurality of subunits of the interleaved version, and values of respective cyclic shifts that are applied to individual subunits of the plurality of subunits of the interleaved version, the respective cyclic shifts being applied based at least in part on whether a frequency diversity associated with at least one transport block of the plurality of transport blocks in an absence of applying the respective cyclic shifts is below a threshold; and
   receiving the plurality of transport blocks and the repetitions over the plurality of resources based at least in part on the mapping.

2. The method of claim 1, further comprising:
   determining a length of the plurality of subunits based at least in part on computing $\mathrm{LCM}[(N_{sched}*N_{IL}), (N_{NB}^{ch,DL}*N_{NB,hop}^{ch,DL})]$, wherein $N_{sched}$ is a quantity of the plurality of transport blocks, $N_{IL}$ is the interleaving granularity, $N_{NB}^{ch,DL}$ is a hopping interval, and $N_{NB,hop}^{ch,DL}$ is a quantity of frequency hops across the plurality of subbands.

3. The method of claim 1, further comprising:
   determining a quantity of the plurality of subunits within a period based at least in part on computing $\mathrm{GCF}(N\lceil N_{NB}^{ch,DL}*N_{NB}^{ch,DL}/N_{IL}\rceil$, wherein $N_{sched}$ is a quantity of the plurality of transport blocks, $N_{IL}$ is the interleaving granularity, $N_{NB}^{ch,DL}$ is a hopping interval, and $N_{NB,hop}^{ch,DL}$ is a quantity of frequency hops across the plurality of subbands.

4. The method of claim 1, further comprising:
   determining whether a cyclic shift is applied to the plurality of subunits based at least in part on a quotient obtained by dividing a quantity of instances of a transport block of the plurality of transport blocks by a quantity of the plurality of subbands without an application of the cyclic shift being below a threshold rate.

5. The method of claim 1, further comprising:
   determining whether a cyclic shift is applied to the plurality of subunits based at least in part on computing $[1 \bmod \mathrm{GCF}(N_{sched}, \lceil N_{NB}^{ch,DL}*N_{NB,hop}^{ch,DL}/N_{IL}\rceil)]*\lceil N_{NB}^{ch,DL}/N_{IL}\rceil$, wherein $N_{sched}$ is a quantity of the plurality of transport blocks, $N_{IL}$ is the interleaving granularity, $N_{NB}^{ch,DL}$ a hopping interval, and $N_{NB,hop}^{ch,DL}$ is a quantity of frequency hops across the plurality of subbands.

6. The method of claim 5, further comprising:
   determining the quantity of the plurality of transport blocks, $N_{sched}$; and
   determining a quotient obtained by dividing a quantity of slots in a full frequency hopping interval with the interleaving granularity, $N_{IL}$,
   wherein determining whether the cyclic shift is applied comprises determining an absence of the cyclic shift for the plurality of subunits based at least in part on the quantity of the plurality of transport blocks and the quotient being co-prime.

7. The method of claim 5, further comprising:
   determining the quantity of the plurality of transport blocks, $N_{sched}$; and
   determining a quotient obtained by dividing a quantity of slots in a full frequency hopping interval with the interleaving granularity, $N_{IL}$,
   wherein determining whether the cyclic shift is applied comprises determining an application of the cyclic shift for the plurality of subunits based at least in part on a greatest common factor of the quantity of the plurality of transport blocks and the quotient being greater than one.

8. The method of claim 7, wherein a value of the cyclic shift is equivalent to $\lceil N_{NB}^{ch,DL}/N_{IL} \rceil$.

9. The method of claim 1, further comprising:
determining a resource of the plurality of resources comprising an initial transport block of the interleaved version based at least in part on computing $\lfloor i/N_{IL} \rfloor$, wherein i is an index of a slot, and $N_{IL}$ is the interleaving granularity.

10. The method of claim 1, further comprising:
determining whether a cyclic shift is applied to the plurality of subunits based at least in part on computing $(\lceil i/\text{LCM}[(N_{sched}*N_{NB}^{ch,DL}),(N_{NB}^{ch,DL}*N_{NB,hop}^{ch,DL})]\rceil*(1 \mod \text{GCF}(N_{sched},\lceil N_{NB}^{ch,DL}*N_{NB,hop}^{ch,DL}/N_{IL} \rceil))*\lceil N_{NB}^{ch,DL}/N_{IL}\rceil)$, wherein i is an index of a transport block of the interleaved version, $N_{sched}$ is a quantity of the plurality of transport blocks, $N_{IL}$ is the interleaving granularity, $N_{NB}^{ch,DL}$ is a hopping interval, and $N_{NB}^{ch,DL}$ is a quantity of frequency hops across the plurality of subbands.

11. A method for wireless communication at a network entity, comprising:
interleaving a plurality of transport blocks and repetitions of the plurality of transport blocks in accordance with an interleaving granularity to obtain an interleaved version of the plurality of transport blocks and the repetitions of the plurality of transport blocks;
mapping, to a plurality of resources that are distributed across a plurality of subbands in accordance with a frequency hopping pattern, the interleaved version based at least in part on the interleaving granularity, a plurality of subunits of the interleaved version, and values of respective cyclic shifts that are applied to individual subunits of the plurality of subunits of the interleaved version, the respective cyclic shifts being applied based at least in part on whether a frequency diversity associated with at least one transport block of the plurality of transport blocks in an absence of applying the respective cyclic shifts is below a threshold;
transmitting, to a user equipment (UE), a single downlink control information (DCI) message scheduling the UE to receive the interleaved version over the plurality of resources in accordance with the mapping; and
transmitting, based at least in part on the single DCI message, the interleaved version over the plurality of resources.

12. The method of claim 11, further comprising:
determining a length of the plurality of subunits based at least in part on computing $\text{LCM}[(N_{sched}*N_{IL}),(N_{NB}^{ch,DL}*N_{NB}^{ch,DL})]$, wherein $N_{sched}$ is a quantity of the plurality of transport blocks, $N_{IL}$ is the interleaving granularity, $N_{NB}^{ch,DL}$ is a hopping interval, and $N_{NB,hop}^{ch,DL}$ is a quantity of frequency hops across the plurality of subbands.

13. The method of claim 11, further comprising:
determining a quantity of the plurality of subunits within a period based at least in part on computing $\text{GCF}(N_{sched},\lceil N_{NB}^{ch,DL}*N_{NB}^{ch,DL}/N_{IL}\rceil)$, wherein $N_{sched}$ is a quantity of the plurality of transport blocks, $N_{IL}$ is the interleaving granularity, $N_{NB}^{ch,DL}$ is a hopping interval, and $N_{NB,hop}^{ch,DL}$ is a quantity of frequency hops across the plurality of subbands.

14. The method of claim 11, further comprising:
applying a cyclic shift to the plurality of subunits based at least in part on a quotient obtained by dividing a quantity of instances of a transport block of the plurality of transport blocks by a quantity of the plurality of subbands without an application of the cyclic shift being below a threshold rate.

15. The method of claim 11, further comprising:
determining whether to apply a cyclic shift to the plurality of subunits based at least in part on computing $[1 \mod \text{GCF} \quad (N_{sched},\lceil N_{NB}^{ch,DL}*N_{NB,hop}^{ch,DL}/N_{IL}\rceil)]*\lceil N_{NB}^{ch,DL}/N_{IL}\rceil$, wherein $N_{sched}$ is a quantity of the plurality of transport blocks, $N_{IL}$ is the interleaving granularity, $N_{NB}^{ch,DL}$ is a hopping interval, and $N_{NB,hop}^{ch,DL}$ is a quantity of frequency hops across the plurality of subbands.

16. The method of claim 15, further comprising:
determining the quantity of the plurality of transport blocks, $N_{sched}$; and
determining a quotient obtained by dividing a quantity of slots in a full frequency hopping interval with the interleaving granularity, $N_{IL}$,
wherein determining whether to apply the cyclic shift comprises refraining from applying the cyclic shift for the plurality of subunits based at least in part on the quantity of the plurality of transport blocks and the quotient being co-prime.

17. The method of claim 15, further comprising:
determining the quantity of the plurality of transport blocks, $N_{sched}$; and
determining a quotient obtained by dividing a quantity of slots in a full frequency hopping interval with the interleaving granularity, $N_{IL}$,
wherein determining whether to apply the cyclic shift comprises applying the cyclic shift for the plurality of subunits based at least in part on a greatest common factor of the quantity of the plurality of transport blocks and the quotient being greater than one.

18. The method of claim 17, wherein a value of the cyclic shift is equivalent to $\lceil N_{NB}^{ch,DL}/N_{IL}\rceil$.

19. The method of claim 11, further comprising:
determining a resource of the plurality of resources comprising an initial transport block of the interleaved version based at least in part on computing $\lfloor i/N_{IL}\rfloor$, wherein i is an index of a slot, and $N_{IL}$ is the interleaving granularity.

20. The method of claim 11, wherein the interleaved version is mapped to the plurality of resources based at least in part on computing $I_{TB}(i)=(\lfloor i/N_{IL}\rfloor+\lfloor i/\text{LCM}[(N_{sched}*N_{IL}),(N_{NB}^{ch,DL}*N_{NB,hop}^{ch,DL})]\rfloor* \quad (1 \mod \text{GCF} \quad (N_{sched},\lceil N_{NB}^{ch,DL}*N_{NB,hop}^{ch,DL}/N_{IL}\rceil))*\lceil N_{NB}^{ch,DL}/N_{IL}\rceil) \mod N_{sched}$, wherein i is an index of a transport block of the interleaved version, $N_{sched}$ is a quantity of the plurality of transport blocks, $N_{IL}$ is the interleaving granularity, $N_{NB}^{ch,DL}$ is a hopping $N_{NB,hop}^{ch,DL}$ is a quantity of frequency hops across the plurality of subbands, and $I_{TB}(i)$ is the $i^{th}$ transport block of the interleaved version.

21. A user equipment (UE) for wireless communication, comprising:
one or more memories storing processor-executable code; and
one or more processors coupled with the one or more memories and individually or collectively operable to execute the code to cause the UE to:
receive a single downlink control information (DCI) message scheduling the UE to receive a plurality of transport blocks and repetitions of the plurality of transport blocks in accordance with an interleaving granularity over a plurality of resources that are distributed across a plurality of subbands in accordance with a frequency hopping pattern;

determine, based at least in part on the interleaving granularity and the frequency hopping pattern, a mapping of an interleaved version of the plurality of transport blocks and the repetitions of the plurality of transport blocks to the plurality of resources based at least in part on the interleaving granularity, a plurality of subunits of the interleaved version, and values of respective cyclic shifts that are applied to individual subunits of the plurality of subunits of the interleaved version, the respective cyclic shifts being applied based at least in part on whether a frequency diversity associated with at least one transport block of the plurality of transport blocks in an absence of applying the respective cyclic shifts is below a threshold; and receive the plurality of transport blocks and the repetitions over the plurality of resources based at least in part on the mapping.

22. The UE of claim 21, wherein the one or more processors are individually or collectively further operable to execute the code to cause the UE to:

determine a length of the plurality of subunits based at least in part on computing $\text{LCM}[(N_{sched}*N_{IL}), (N_{NB}^{ch,DL}*N_{NB,hop}^{ch,DL})]$, wherein $N_{sched}$ is a quantity of the plurality of transport blocks, $N_{IL}$ is the interleaving granularity, $N_{NB}^{ch,DL}$ is a hopping interval, and $N_{NB,hop}^{ch,DL}$ is a quantity of frequency hops across the plurality of subbands.

23. The UE of claim 21, wherein the one or more processors are individually or collectively further operable to execute the code to cause the UE to:

determine a quantity of the plurality of subunits within a period based at least in part on computing $[1 \mod \text{GCF}(N_{sched}, \lceil N_{NB}^{ch,DL}*N_{NB,hop}^{ch,DL}/N_{IL} \rceil)]*\lceil N_{NB}^{ch,DL}/N_{IL} \rceil$, wherein $N_{sched}$ is a quantity of the plurality of transport blocks, $N_{IL}$ is the interleaving granularity, $N_{NB}^{ch,DL}$ is a hopping interval, and $N_{NB,hop}^{ch,DL}$ is a quantity of frequency hops across the plurality of subbands.

24. The UE of claim 21, wherein the one or more processors are individually or collectively further operable to execute the code to cause the UE to:

determine whether a cyclic shift is applied to the plurality of subunits based at least in part on computing $[1 \mod \text{GCF}(N_{sched}, \lceil N_{NB}^{ch,DL}*N_{NB,hop}^{ch,DL} \rceil)]*\lceil N_{NB}^{ch,DL}/N_{IL} \rceil$, wherein $N_{sched}$ is a quantity of the plurality of transport blocks, $N_{IL}$ is the interleaving granularity, $N_{NB}^{ch,DL}$ is a hopping interval, and $N_{NB,hop}^{ch,DL}$ is a quantity of frequency hops across the plurality of subbands.

25. The UE of claim 21, wherein the one or more processors are individually or collectively further operable to execute the code to cause the UE to:

determine whether a cyclic shift is applied to the plurality of subunits (based at least in part on computing $(\lceil i/\text{LCM}[(N_{sched}*N_{IL}),(N_{NB}^{ch,DL}*N_{NB,hop}^{ch,DL})] \rceil * (1 \mod \text{GCF}(N_{sched}, \lceil N_{NB}^{ch,DL}*N_{NB,hop}^{ch,DL} \rceil))*\lceil N_{NB}^{ch,DL}/N_{IL} \rceil)$, wherein i is an index of a transport block of the interleaved version, $N_{sched}$ is a quantity of the plurality of transport blocks, $N_{IL}$ is the interleaving granularity, $N_{NB}^{ch,DL}$ is a hopping interval, and $N_{NB,hop}^{ch,DL}$ is a quantity of frequency hops across the plurality of subbands.

26. A network entity for wireless communication, comprising:

one or more memories storing processor-executable code; and one or more processors coupled with the one or more memories and individually or collectively operable to execute the code to cause the network entity to:

interleave a plurality of transport blocks and repetitions of the plurality of transport blocks in accordance with an interleaving granularity to obtain an interleaved version of the plurality of transport blocks and the repetitions of the plurality of transport blocks;

map, to a plurality of resources that are distributed across a plurality of subbands in accordance with a frequency hopping pattern, the interleaved version based at least in part on the interleaving granularity, a plurality of subunits of the interleaved version, and values of respective cyclic shifts that are applied to individual subunits of the plurality of subunits of the interleaved version, the respective cyclic shifts being applied based at least in part on whether a frequency diversity associated with at least one transport block of the plurality of transport blocks in an absence of applying the respective cyclic shifts is below a threshold;

transmit, to a user equipment (UE), a single downlink control information (DCI) message scheduling the UE to receive the interleaved version over the plurality of resources in accordance with the mapping; and transmit, based at least in part on the single DCI message, the interleaved version over the plurality of resources.

27. The network entity of claim 26, wherein the one or more processors are individually or collectively further operable to execute the code to cause the network entity to:

determine a length of the plurality of subunits based at least in part on computing $\text{LCM}[(N_{sched}*N_{IL}), (N_{NB}^{ch,DL}*N_{NB,hop}^{ch,DL})]$, wherein $N_{sched}$ is a quantity of the plurality of transport blocks, $N_{IL}$ is the interleaving granularity, $N_{NB}^{ch,DL}$ is a hopping interval, and $N_{NB,hop}^{ch,DL}$ is a quantity of frequency hops across the plurality of subbands.

28. The network entity of claim 26, wherein the one or more processors are individually or collectively further operable to execute the code to cause the network entity to:

determine a quantity of the plurality of subunits within a period based at least in part on computing $\text{GCF}(N_{sched}, \lceil N_{NB}^{ch,DL}*N_{NB}^{ch,DL}/N_{IL} \rceil)$, wherein $N_{sched}$ is a quantity of the plurality of transport blocks, $N_{IL}$ is the interleaving granularity, $N_{NB}^{ch,DL}$ is a hopping interval, and $N_{NB,hop}^{ch,DL}$ is a quantity of frequency hops across the plurality of subbands.

29. The network entity of claim 26, wherein the one or more processors are individually or collectively further operable to execute the code to cause the network entity to:

apply a cyclic shift to the plurality of subunits based at least in part on a quotient obtained by dividing a quantity of instances of a transport block of the plurality of transport blocks by a quantity of the plurality of subbands without an application of the cyclic shift being below a threshold rate.

30. The network entity of claim 26, wherein the one or more processors are individually or collectively further operable to execute the code to cause the network entity to:

determine whether to apply a cyclic shift to the plurality of subunits based at least in part on computing $[1 \bmod \text{GCF}(N_{sched}, \lceil N_{NB}^{ch,DL} * N_{NB,hop}^{ch,DL}/N_{IL} \rceil)] * \lceil N_{NB}^{ch,DL}/N_{IL} \rceil$, wherein $N_{sched}$ is a quantity of the plurality of transport blocks, $N_{IL}$ is the interleaving granularity, $N_{NB}^{ch,DL}$ is a hopping interval, and $N_{NB,hop}^{ch,DL}$ is a quantity of frequency hops across the plurality of subbands.

* * * * *